United States Patent
Salter et al.

(10) Patent No.: US 10,420,189 B2
(45) Date of Patent: Sep. 17, 2019

(54) VEHICLE LIGHTING ASSEMBLY

(71) Applicant: Ford Global Technologies, LLC, Dearborn, MI (US)

(72) Inventors: Stuart C. Salter, White Lake, MI (US); Paul Kenneth Dellock, Northville, MI (US); Jason C. Rogers, Shelby Township, MI (US); Christopher Anthony Danowski, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/152,168

(22) Filed: May 11, 2016

(65) Prior Publication Data
US 2017/0332458 A1    Nov. 16, 2017

(51) Int. Cl.
| B60Q 1/26 | (2006.01) |
| B60Q 1/30 | (2006.01) |
| H05B 37/02 | (2006.01) |
| F21S 45/50 | (2018.01) |
| F21S 43/13 | (2018.01) |

(Continued)

(52) U.S. Cl.
CPC ........... *H05B 37/0227* (2013.01); *B60Q 1/04* (2013.01); *B60Q 1/30* (2013.01); *B60Q 1/32* (2013.01); *B60Q 1/50* (2013.01); *F21S 43/13* (2018.01); *F21S 43/14* (2018.01); *F21S 43/195* (2018.01); *F21S 45/50* (2018.01); *G09F 13/20* (2013.01); *G09F 21/04* (2013.01);

(Continued)

(58) Field of Classification Search
CPC ............... H05B 37/0227; H05B 37/02; H05B 37/0272; B60Q 1/04; B60Q 1/22; B60Q 1/26; B60Q 1/2607; B60Q 1/2619; B60Q 1/30; B60Q 1/303; B60Q 1/32; B60Q 1/323; B60Q 1/46; B60Q 1/48; B60Q 9/002; F21S 48/214; F21S 48/215; G09F 13/20; G09F 21/04
See application file for complete search history.

(56) References Cited

U.S. PATENT DOCUMENTS

| 2,486,859 A | 11/1949 | Meijer et al. |
| 5,053,930 A | 10/1991 | Benavides |

(Continued)

FOREIGN PATENT DOCUMENTS

| CN | 101337492 A | 1/2009 |
| CN | 201169230 Y | 2/2009 |

(Continued)

*Primary Examiner* — Thai Pham
(74) *Attorney, Agent, or Firm* — Vichit Chea; Price Heneveld LLP

(57) ABSTRACT

A vehicle is provided herein. The vehicle includes a panel having a light-producing assembly including a plurality of light sources arranged therein and attached to the panel. A photoluminescent structure is disposed on the light-producing assembly and is configured to luminesce in response to excitation by the plurality of light sources. A vehicle sensor is configured to initiate an illumination sequence of the plurality of light sources based on a change in vehicular movement. A controller for illuminates the plurality of light sources based on predefined events when an electronic device is disposed proximately to the vehicle and is in communication with the controller.

19 Claims, 11 Drawing Sheets

(51) Int. Cl.

| | | |
|---|---|---|
| *F21S 43/14* | (2018.01) | |
| *B60Q 1/04* | (2006.01) | |
| *G09F 13/20* | (2006.01) | |
| *G09F 21/04* | (2006.01) | |
| *B60Q 1/32* | (2006.01) | |
| *B60Q 1/50* | (2006.01) | |
| *F21S 43/19* | (2018.01) | |
| *B60Q 1/24* | (2006.01) | |

(52) U.S. Cl.
CPC .......... *H05B 37/0272* (2013.01); *B60Q 1/24* (2013.01); *B60Q 2400/40* (2013.01)

(56) References Cited

U.S. PATENT DOCUMENTS

| | | | |
|---|---|---|---|
| 5,434,013 | A | 7/1995 | Fernandez |
| 5,534,733 | A * | 7/1996 | Wetzel ................ B60Q 1/54 307/10.8 |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,133,851 | A | 10/2000 | Johnson |
| 6,260,988 | B1 | 7/2001 | Misawa et al. |
| 6,294,990 | B1 | 9/2001 | Knoll et al. |
| 6,419,854 | B1 | 7/2002 | Yocom et al. |
| 6,446,375 | B1 | 9/2002 | Davis |
| 6,494,490 | B1 | 12/2002 | Trantoul |
| 6,577,073 | B2 | 6/2003 | Shimizu et al. |
| 6,606,027 | B1 | 8/2003 | Reeves et al. |
| 6,700,502 | B1 | 3/2004 | Pederson |
| 6,711,481 | B1 * | 3/2004 | King ................... B60Q 1/14 315/82 |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |
| 6,953,536 | B2 | 10/2005 | Yen et al. |
| 6,990,922 | B2 | 1/2006 | Ichikawa et al. |
| 7,015,893 | B2 | 3/2006 | Li et al. |
| 7,048,422 | B1 | 5/2006 | Solomon |
| 7,161,472 | B2 | 1/2007 | Strumolo et al. |
| 7,213,923 | B2 | 5/2007 | Liu et al. |
| 7,216,997 | B2 | 5/2007 | Anderson, Jr. |
| 7,249,869 | B2 | 7/2007 | Takahashi et al. |
| 7,264,366 | B2 | 9/2007 | Hulse |
| 7,264,367 | B2 | 9/2007 | Hulse |
| 7,347,576 | B2 | 3/2008 | Wang et al. |
| 7,354,182 | B2 * | 4/2008 | Bartels ................ B60Q 1/326 362/234 |
| 7,441,914 | B2 | 10/2008 | Palmer et al. |
| 7,458,698 | B2 | 12/2008 | Heathcock et al. |
| 7,501,749 | B2 | 3/2009 | Takeda et al. |
| 7,575,349 | B2 | 8/2009 | Bucher et al. |
| 7,635,212 | B2 | 12/2009 | Seidler |
| 7,726,856 | B2 | 6/2010 | Tsutsumi |
| 7,745,818 | B2 | 6/2010 | Sofue et al. |
| 7,753,541 | B2 | 7/2010 | Chen et al. |
| 7,834,548 | B2 | 11/2010 | Jousse et al. |
| 7,862,220 | B2 | 1/2011 | Cannon et al. |
| 7,876,205 | B2 | 1/2011 | Catten et al. |
| 7,987,030 | B2 | 7/2011 | Flores et al. |
| 8,016,465 | B2 | 9/2011 | Egerer et al. |
| 8,022,818 | B2 | 9/2011 | la Tendresse et al. |
| 8,044,415 | B2 | 10/2011 | Messere et al. |
| 8,066,416 | B2 | 11/2011 | Bucher |
| 8,071,988 | B2 | 12/2011 | Lee et al. |
| 8,097,843 | B2 | 1/2012 | Agrawal et al. |
| 8,103,414 | B2 | 1/2012 | Boss et al. |
| 8,118,441 | B2 | 2/2012 | Hessling |
| 8,120,236 | B2 | 2/2012 | Auday et al. |
| 8,136,425 | B2 | 3/2012 | Bostick |
| 8,163,201 | B2 | 4/2012 | Agrawal et al. |
| 8,169,131 | B2 | 5/2012 | Murazaki et al. |
| 8,178,852 | B2 | 5/2012 | Kingsley et al. |
| 8,197,105 | B2 | 6/2012 | Yang |
| 8,203,260 | B2 | 6/2012 | Li et al. |
| 8,207,511 | B2 | 6/2012 | Bortz et al. |
| 8,232,533 | B2 | 7/2012 | Kingsley et al. |
| 8,247,761 | B1 | 8/2012 | Agrawal et al. |
| 8,261,686 | B2 | 9/2012 | Birman et al. |
| 8,286,378 | B2 | 10/2012 | Martin et al. |
| 8,317,329 | B2 | 11/2012 | Seder et al. |
| 8,317,359 | B2 | 11/2012 | Harbers et al. |
| 8,408,765 | B2 | 4/2013 | Kuhlman et al. |
| 8,408,766 | B2 | 4/2013 | Wilson et al. |
| 8,415,642 | B2 | 4/2013 | Kingsley et al. |
| 8,421,811 | B2 | 4/2013 | Odland et al. |
| 8,459,832 | B2 | 6/2013 | Kim |
| 8,466,438 | B2 | 6/2013 | Lambert et al. |
| 8,519,359 | B2 | 8/2013 | Kingsley et al. |
| 8,519,362 | B2 | 8/2013 | Labrot et al. |
| 8,539,702 | B2 | 9/2013 | Li et al. |
| 8,552,848 | B2 | 10/2013 | Rao et al. |
| 8,606,430 | B2 | 12/2013 | Seder et al. |
| 8,624,716 | B2 | 1/2014 | Englander |
| 8,631,598 | B2 | 1/2014 | Li et al. |
| 8,653,553 | B2 | 2/2014 | Yamazaki et al. |
| 8,664,624 | B2 | 3/2014 | Kingsley et al. |
| 8,683,722 | B1 | 4/2014 | Cowan |
| 8,724,054 | B2 | 5/2014 | Jones |
| 8,754,426 | B2 | 6/2014 | Marx et al. |
| 8,773,012 | B2 | 7/2014 | Ryu et al. |
| 8,846,184 | B2 | 9/2014 | Agrawal et al. |
| 8,851,694 | B2 | 10/2014 | Harada |
| 8,876,352 | B2 | 11/2014 | Robbins et al. |
| 8,905,610 | B2 | 12/2014 | Coleman et al. |
| 8,922,388 | B2 | 12/2014 | Nykerk |
| 8,937,454 | B2 | 1/2015 | Baarman et al. |
| 8,952,341 | B2 | 2/2015 | Kingsley et al. |
| 8,963,705 | B2 | 2/2015 | Miller et al. |
| 8,994,495 | B2 | 3/2015 | Dassanayake et al. |
| 9,006,751 | B2 | 4/2015 | Kleo et al. |
| 9,018,833 | B2 | 4/2015 | Lowenthal et al. |
| 9,057,021 | B2 | 6/2015 | Kingsley et al. |
| 9,059,378 | B2 | 6/2015 | Verger et al. |
| 9,065,447 | B2 | 6/2015 | Buttolo et al. |
| 9,067,530 | B2 | 6/2015 | Bayersdorfer et al. |
| 9,187,034 | B2 | 11/2015 | Tarahomi et al. |
| 9,194,168 | B1 | 11/2015 | Lu et al. |
| 9,299,887 | B2 | 3/2016 | Lowenthal et al. |
| 9,315,148 | B2 | 4/2016 | Schwenke et al. |
| 9,442,888 | B2 | 9/2016 | Stanfield et al. |
| 9,452,709 | B2 | 9/2016 | Aburto Crespo |
| 9,568,659 | B2 | 2/2017 | Verger et al. |
| 9,579,987 | B2 | 2/2017 | Penilla et al. |
| 9,616,812 | B2 | 4/2017 | Sawayanagi |
| 9,772,071 | B2 * | 9/2017 | Van Bommel ........... F21K 9/64 |
| 2001/0030870 | A1 * | 10/2001 | Hiramatsu ............ B60Q 1/12 362/465 |
| 2002/0159741 | A1 | 10/2002 | Graves et al. |
| 2002/0163792 | A1 | 11/2002 | Formoso |
| 2003/0167668 | A1 | 9/2003 | Fuks et al. |
| 2003/0179548 | A1 | 9/2003 | Becker et al. |
| 2004/0213088 | A1 | 10/2004 | Fuwausa |
| 2005/0084229 | A1 | 4/2005 | Babbitt et al. |
| 2005/0189795 | A1 | 9/2005 | Roessler |
| 2006/0087826 | A1 | 4/2006 | Anderson, Jr. |
| 2006/0097121 | A1 | 5/2006 | Fugate |
| 2006/0227532 | A1 * | 10/2006 | Ko ...................... G06F 3/0202 362/85 |
| 2006/0271261 | A1 * | 11/2006 | Flores .................. B60Q 9/008 701/49 |
| 2006/0273891 | A1 | 12/2006 | Quach et al. |
| 2007/0030136 | A1 * | 2/2007 | Teshima ............... B60Q 1/323 340/458 |
| 2007/0032319 | A1 | 2/2007 | Tufte |
| 2007/0171039 | A1 * | 7/2007 | Yang .................... B60Q 1/444 340/466 |

(56) References Cited

U.S. PATENT DOCUMENTS

| | | | |
|---|---|---|---|
| 2007/0265891 A1* | 11/2007 | Guo | G06Q 10/02 705/5 |
| 2007/0285938 A1 | 12/2007 | Palmer et al. | |
| 2007/0297045 A1 | 12/2007 | Sakai et al. | |
| 2008/0205075 A1 | 8/2008 | Hikmet et al. | |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2009/0299577 A1* | 12/2009 | Demant | B60R 22/48 701/45 |
| 2010/0102736 A1 | 4/2010 | Hessling | |
| 2010/0154261 A1* | 6/2010 | Bozlo | B60Q 3/044 40/541 |
| 2010/0213847 A1* | 8/2010 | Biondo | B60Q 1/085 315/82 |
| 2011/0012062 A1 | 1/2011 | Agrawal et al. | |
| 2011/0025951 A1* | 2/2011 | Jones | H01L 33/50 349/70 |
| 2011/0170310 A1* | 7/2011 | Haenen | F21S 48/1195 362/516 |
| 2011/0265360 A1 | 11/2011 | Podd et al. | |
| 2011/0285522 A1* | 11/2011 | Schuessler | B60Q 5/00 340/426.22 |
| 2012/0001406 A1 | 1/2012 | Paxton et al. | |
| 2012/0020101 A1 | 1/2012 | Pastrick et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0009855 A1 | 1/2013 | Gally et al. | |
| 2013/0050979 A1 | 2/2013 | Van De Ven et al. | |
| 2013/0092965 A1 | 4/2013 | Kijima et al. | |
| 2013/0119862 A1* | 5/2013 | Ahn | B60Q 1/143 315/79 |
| 2013/0154821 A1 | 6/2013 | Miller et al. | |
| 2013/0201013 A1* | 8/2013 | Schoenberg | B60R 22/48 340/438 |
| 2013/0311049 A1* | 11/2013 | Lee | B60Q 1/12 701/49 |
| 2013/0335994 A1 | 12/2013 | Mulder et al. | |
| 2014/0003044 A1 | 1/2014 | Harbers et al. | |
| 2014/0029281 A1* | 1/2014 | Suckling | F21V 9/16 362/510 |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0288832 A1 | 9/2014 | Hoch et al. | |
| 2014/0373898 A1 | 12/2014 | Rogers et al. | |
| 2015/0009695 A1* | 1/2015 | Christmas | B60Q 1/16 362/466 |
| 2015/0046027 A1 | 2/2015 | Sura et al. | |
| 2015/0085488 A1 | 3/2015 | Grote, III et al. | |
| 2015/0109602 A1 | 4/2015 | Martin et al. | |
| 2015/0138789 A1 | 5/2015 | Singer et al. | |
| 2015/0267881 A1 | 9/2015 | Salter et al. | |
| 2015/0307033 A1 | 10/2015 | Preisler et al. | |
| 2015/0324708 A1 | 11/2015 | Skipp et al. | |
| 2015/0339928 A1 | 11/2015 | Ramanujam | |
| 2015/0346727 A1 | 12/2015 | Ramanujam | |
| 2015/0353000 A1* | 12/2015 | Kowatzki | B60Q 1/24 315/77 |
| 2015/0366036 A1 | 12/2015 | Luostarinen | |
| 2016/0016506 A1 | 1/2016 | Collins et al. | |
| 2016/0082880 A1 | 3/2016 | Co et al. | |
| 2016/0101725 A1* | 4/2016 | Oh | B60K 37/04 315/77 |
| 2016/0102819 A1 | 4/2016 | Misawa et al. | |
| 2016/0131327 A1 | 5/2016 | Moon et al. | |
| 2016/0214535 A1 | 7/2016 | Penilla et al. | |
| 2016/0236613 A1 | 8/2016 | Trier | |
| 2016/0240794 A1 | 8/2016 | Yamada et al. | |
| 2017/0158125 A1 | 6/2017 | Schuett et al. | |
| 2017/0213165 A1 | 7/2017 | Stauffer et al. | |
| 2017/0253179 A1 | 9/2017 | Kumada | |

FOREIGN PATENT DOCUMENTS

| | | |
|---|---|---|
| CN | 201193011 Y | 2/2009 |
| CN | 201961253 U | 9/2011 |
| CN | 202357840 U | 8/2012 |
| CN | 204127823 U | 1/2015 |
| CN | 104869728 A | 8/2015 |
| CN | 105303642 A | 2/2016 |
| DE | 2641066 A1 | 3/1978 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2719580 A1 | 4/2014 |
| EP | 2778209 A1 | 9/2014 |
| JP | 2000052859 A | 2/2000 |
| JP | 2000159011 A | 6/2000 |
| JP | 2007238063 A | 9/2007 |
| KR | 20060026531 A | 3/2006 |
| WO | 02077518 A1 | 10/2002 |
| WO | 2006047306 A1 | 5/2006 |
| WO | 2008093266 A1 | 8/2008 |
| WO | 2011090417 A1 | 7/2011 |
| WO | 2014068440 A1 | 5/2014 |
| WO | 2014161927 A1 | 10/2014 |

* cited by examiner

VEHICLE LIGHTING ASSEMBLY

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to another aspect of the present invention, a vehicle is disclosed. The vehicle includes a panel having a light-producing assembly including a plurality of light sources arranged therein and attached to the panel. A photoluminescent structure is disposed on the light-producing assembly and is configured to luminesce in response to excitation by the plurality of light sources. A vehicle sensor is configured to initiate an illumination sequence of the plurality of light sources based on a change in vehicular movement. A controller is configured to illuminate the plurality of light sources based on predefined events when an electronic device is disposed proximately to the vehicle and is in communication with the controller.

According to another aspect of the present invention, a lighting assembly for a vehicle panel is disclosed. The lighting assembly includes a light-producing assembly. A photoluminescent structure is disposed on the light-producing assembly and is configured to luminesce in response to excitation by a light source of the light-producing assembly. A controller is configured to activate the plurality of light sources based on predefined events when an electronic device is disposed proximately to the vehicle and is in communication with the controller.

According to another aspect of the present invention, a lighting assembly for a vehicle is disclosed. The lighting assembly includes a light source. A photoluminescent structure is disposed on the light source and configured to luminesce in response to excitation by the light source. A vehicle sensor is disposed on the vehicle. A controller is configured to initiate an illumination sequence of the light source based on a change in vehicular condition as sensed by the vehicle sensor.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated lighting assembly that may be attached to a vehicle. The lighting assembly may include one or more photoluminescent structures configured to convert an excitation light received from an associated light source to a converted light at a different wavelength typically found in the visible spectrum.

Figure 1A:
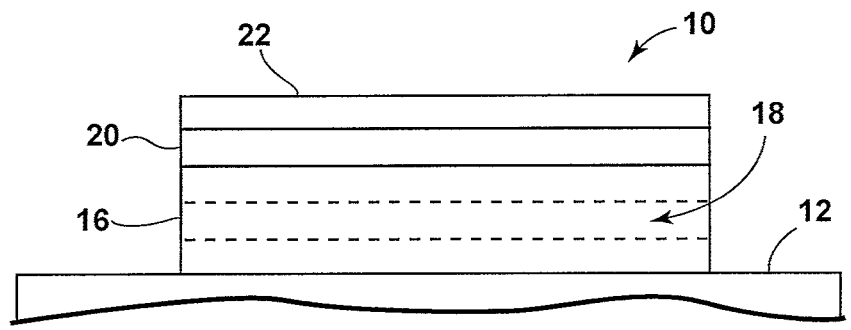
FIG. 1A is a side view of a photoluminescent structure rendered as a coating for use in a vehicle lighting assembly according to one embodiment.
Figure 1B:
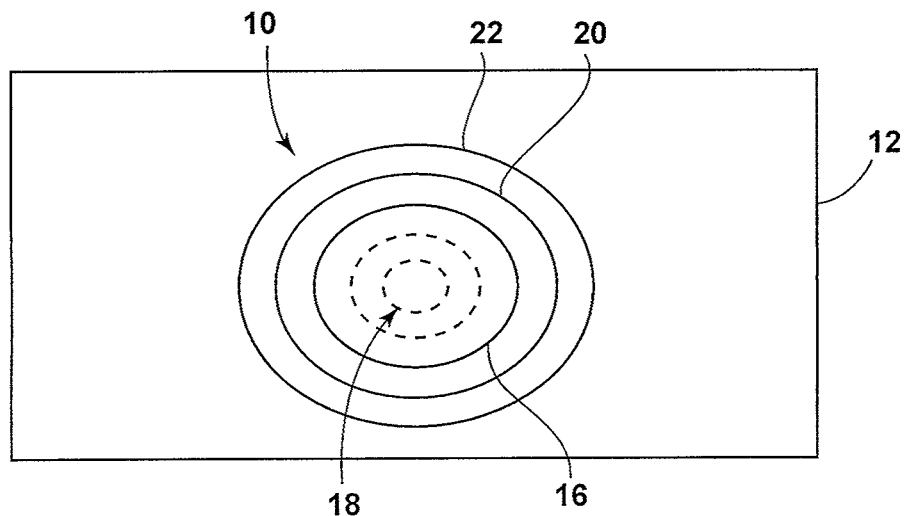
FIG. 1B is a top view of a photoluminescent structure rendered as a discrete particle according to one embodiment.
Figure 1C:
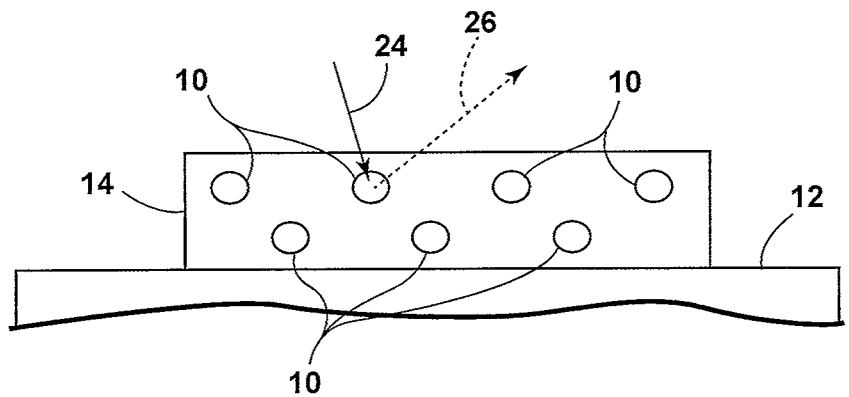
FIG. 1C is a side view of a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 36 (FIG. 3) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 36. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source 36). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m² after a period of 10 minutes. Additionally, the long persistence photoluminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources 36 that emits the excitation light 24, including, but not limited to, natural light sources (e.g., the sun) and/or any artificial light source 36. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2:
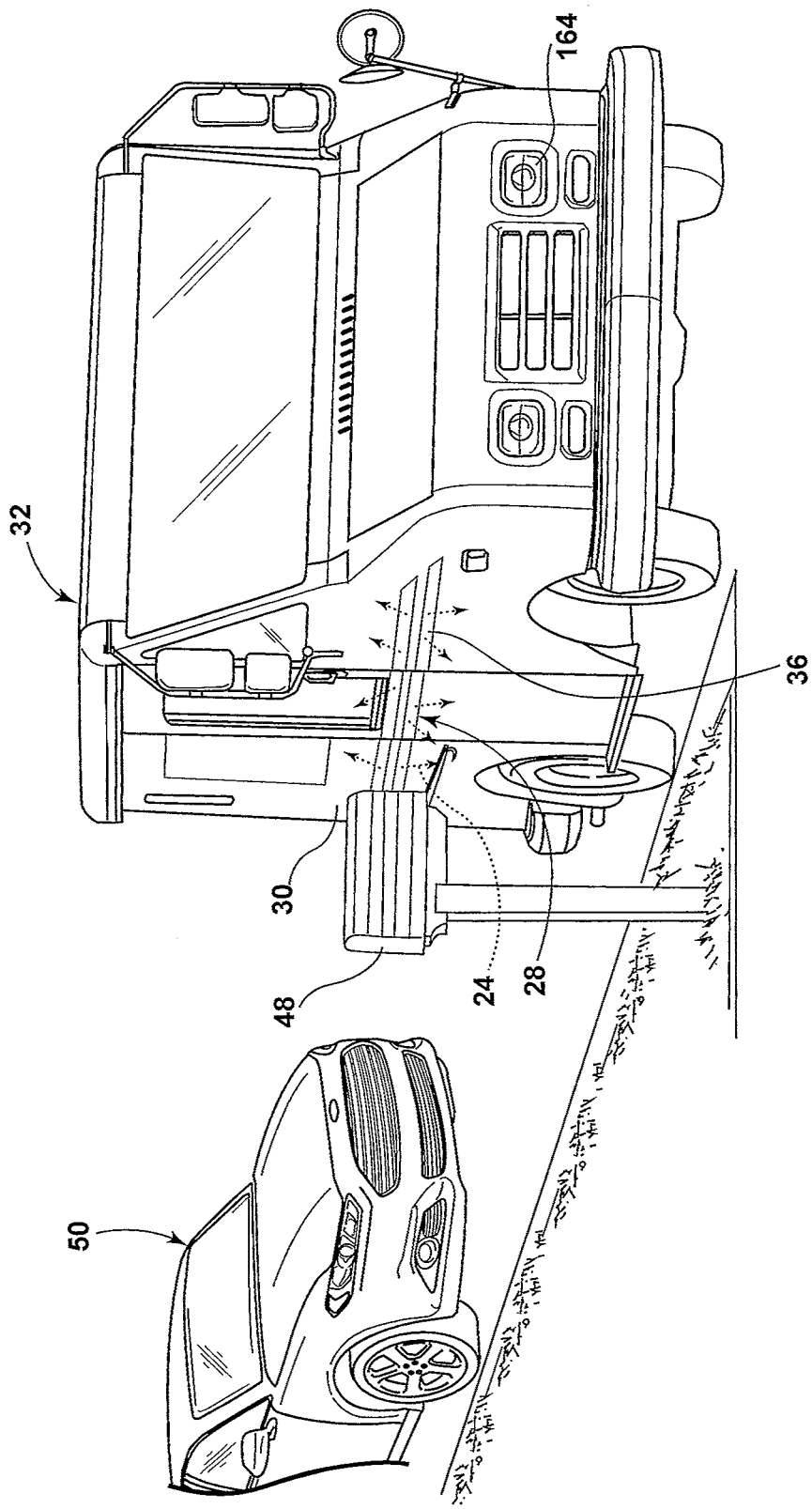
FIG. 2 is a front perspective view of a vehicle employing a lighting assembly on a side body panel according to one embodiment.

Referring to FIG. 2, a lighting assembly 28 is attached to and configured to illuminate a portion of an exterior body panel 30 of a vehicle 32, according to one embodiment. As shown in FIG. 2, the lighting assembly 28 is arranged as an elongated assembly extending longitudinally along a portion of the body panel 30. The elongated lighting assembly 28 may be formed from one or more portions.

The vehicle 32, in some embodiments, may be configured as a commercial or public vehicle, such as a transport vehicle. The lighting assembly 28 may assist a vehicle operator in preventing accidents by providing additional notifications and/or information to approaching vehicles 50. The lighting assembly 28 may also assist an occupant 38 (FIG. 3) thereof by illuminating delivery locations or receptacles adjacently located to the vehicle 32, such as mailboxes. As will be described in greater detail below, the lighting assembly 28 may be used in conjunction with an electronic devices 34 (FIG. 3) to illuminate the lighting assembly 28 in one or more predefined illumination sequences based on a vehicular condition, an occupant 38 position, and/or an occupant 38 task, such as entering and exiting the vehicle 32 to delivery packages, or frequently stopping the vehicle 32 to place delivery items in receptacle.

As will be described in greater detail below, the lighting assembly 28 may be a multilayered assembly that includes the light source 36. Any form of light source may be disposed on and/or within the lighting assembly 28. For example, fluorescent lighting, light emitting diodes (LEDs), organic LEDs (OLEDs), polymer LEDs (PLEDs), solid-state lighting, or any other form of lighting configured to emit light may be utilized. The light source 36 may be configured to emit a wavelength of excitation light 24 that is characterized as ultraviolet light (~10-400 nanometers in wavelength), violet light (~380-450 nanometers in wavelength), blue light (~450-495 nanometers in wavelength), and/or infrared light (IR) (~700 nm-1 mm in wavelength) to take advantage of the relative low cost attributable to those types of LEDs.

According to one embodiment, the lighting assembly(s) 28 may be configured to luminesce (i.e., emit converted light 26) in response to excitation light 24 emitted from the light source 36. The luminescence exhibited by the lighting assembly 28 may provide one or more distinct lighting functions. For instance, the lighting assembly 28 may luminesce in a first color to indicate that the vehicle 32 is about to come to a stop. In another instance, the lighting assembly 28 may luminesce in a second color that is visually distinct from the first color to indicate that the operator of the vehicle 32 is unattended.

Figure 3:
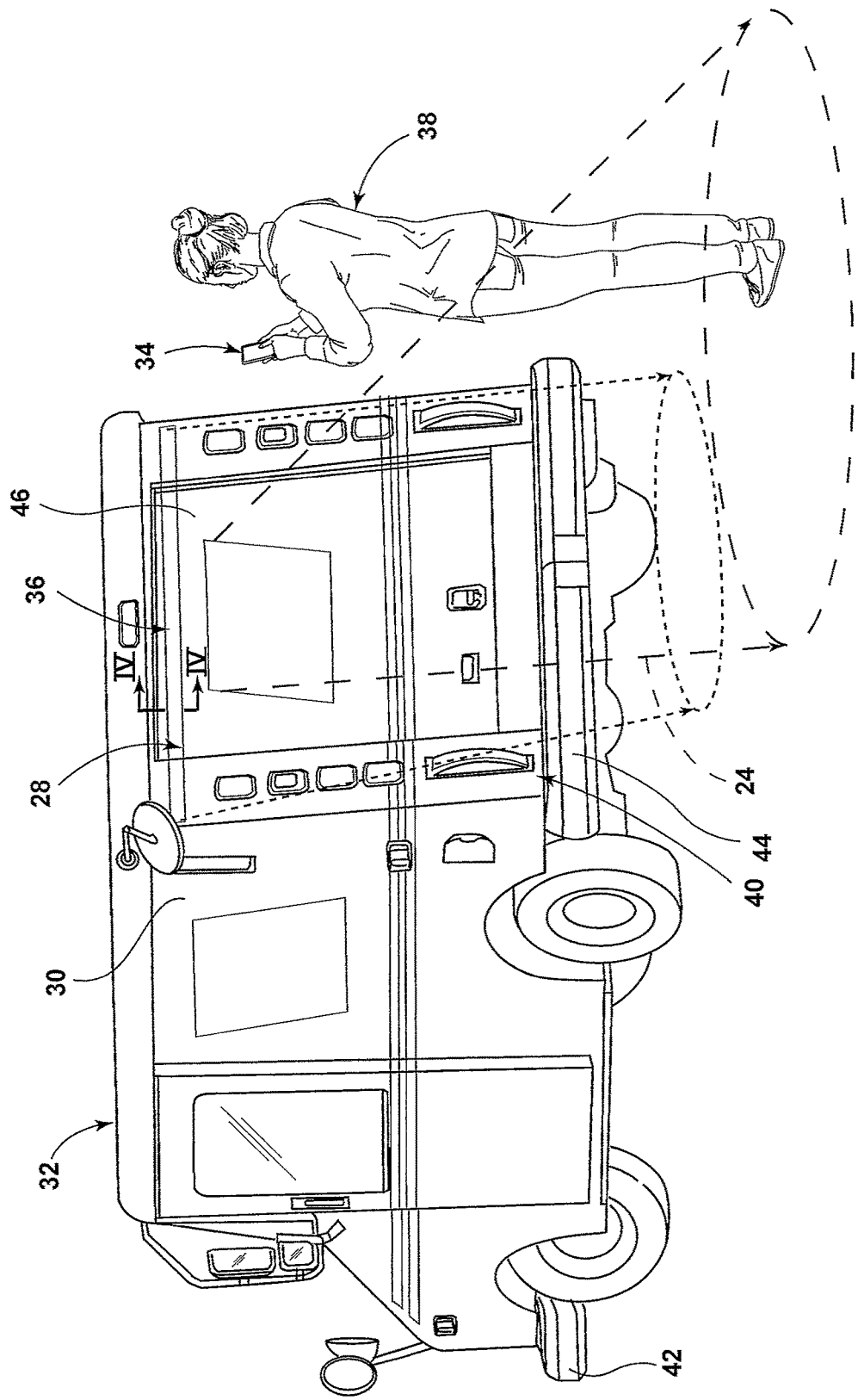
FIG. 3 is a rear perspective view of the vehicle employing lighting assemblies on a rear portion of the vehicle and an electronic device communicating with the lighting assembly, according to one embodiment.

Referring to FIG. 3, one or more lighting assemblies 28 may be provided on a rear portion 40 of the vehicle 32. The lighting assembly(s) 28 may have a linear and/or non-linear shape. Moreover, the lighting assembly 28 may be permanently or removably disposed on any location on the vehicle 32 that is viewable to other proximately located vehicles. For example, a lighting assembly 28 may be disposed on a front 42 and/or a rear bumper 44 of the vehicle 32.

With further reference to FIG. 3, in various embodiments, the lighting assembly 28 is configured to detect the electronic device 34. The electronic device 34 may include a Delivery Information Acquisition Device (DIAD), a cellphone, a tablet, a key FOB, wearable device (e.g., fitness band, watch, glasses, jewelry, wallet), apparel (e.g., a tee shirt, gloves, shoes or other accessories), personal digital assistant, headphones and/or other devices capable of wireless transmission (e.g., radio frequency, Bluetooth, ultrasonic). As discussed in greater detail below, the lighting assembly 28 may alter the direction of light emitted or the illumination sequence of the light based on movement and/or the detected location of the electronic device 34 and/or the vehicle 32.

Figure 4A:
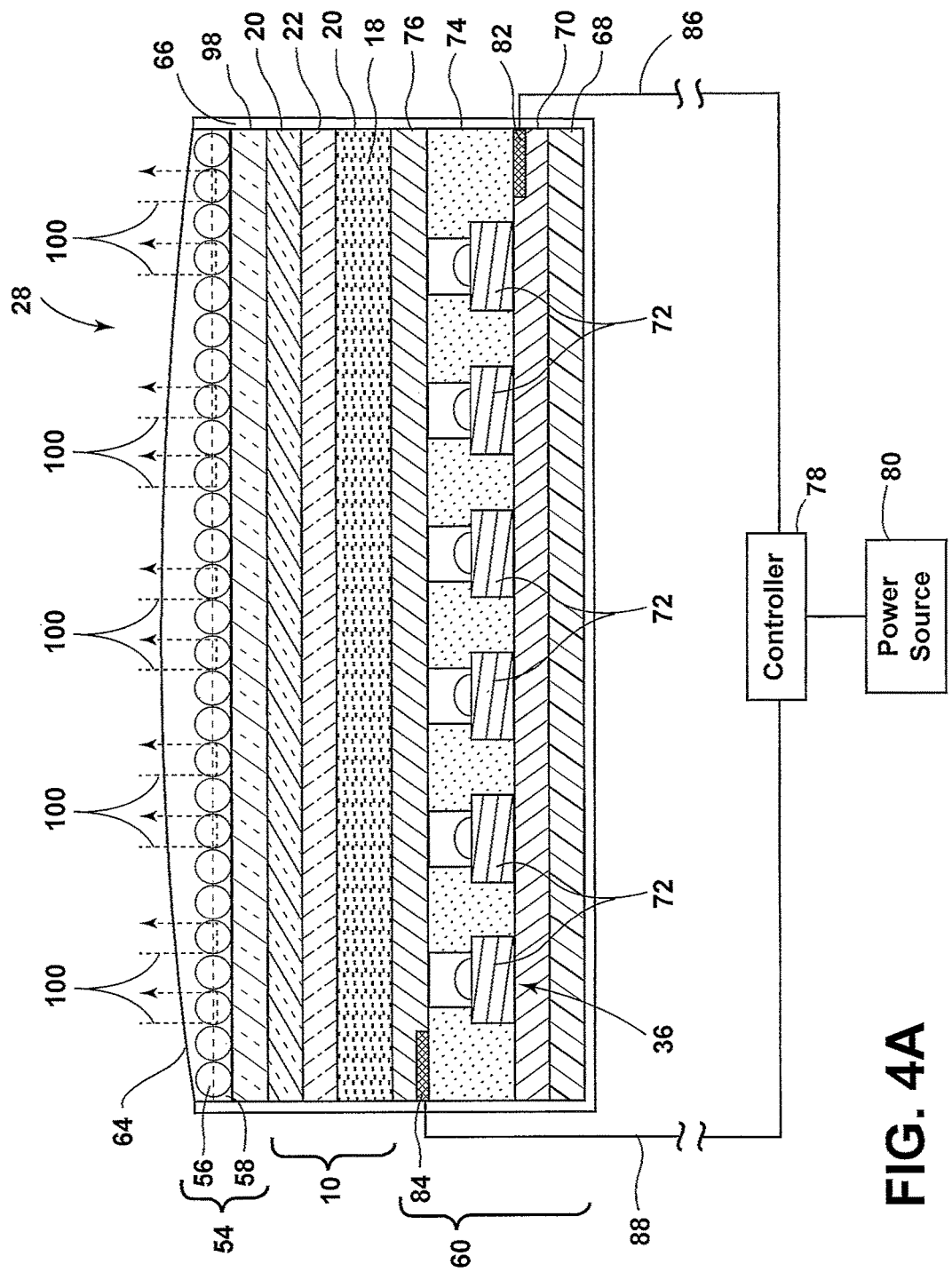
FIG. 4A is a cross-sectional view taken along line IV-IV of FIG. 2 illustrating a light source according to one embodiment.

Referring to FIGS. 4A-4E, a cross-sectional view of the light source 36 capable of use on a vehicle 32 with an external photoluminescent structure 10 is shown according to one embodiment. As illustrated in FIG. 4A, the light source 36 may have a stacked arrangement that includes a light-producing assembly 60, a photoluminescent structure 10, a viewable portion 64, a reflective layer 54, and an overmold material 66. It should be appreciated that the viewable portion 64 and the overmold material 66 may be two separate components, or may be integrally formed as a single component.

The light-producing assembly 60 may correspond to a thin-film or printed light emitting diode (LED) assembly and includes a substrate 68 as its lowermost layer. The substrate 68 may include a polycarbonate, poly-methyl methacrylate (PMMA), or polyethylene terephthalate (PET) material on the order of 0.005 to 0.060 inches thick and is arranged over the intended vehicle substrate on which the light source 36 is to be received (e.g., the body panel 30). Alternatively, as a cost saving measure, the substrate 68 may directly correspond to a preexisting structure (e.g., a portion of the body panel 30, etc.).

The light-producing assembly 60 includes a positive electrode 70 arranged over the substrate 68. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via corresponding bus bars 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars 82, 84. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 70 may be arranged over the aforementioned semiconductor ink 74. Likewise, additional components, such as the bus bars 82, 84 may also be placed in any orientation such that the light-producing assembly 60 may emit converted light 26 towards a desired location.

The LED sources 72 may be dispersed in a random or controlled fashion within the semiconductor ink 74 and may be configured to emit focused or non-focused light toward the photoluminescent structure 10. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies 60 is disclosed in U.S. Pat. No. 9,299,887 to Lowenthal et al. entitled "ULTRA-THIN PRINTED LED LAYER REMOVED FROM SUBSTRATE," the entire disclosure of which is incorporated herein by reference.

Referring still to FIG. 4A, the photoluminescent structure 10 is arranged over the negative electrode 76 as a coating, layer, film or other suitable deposition. With respect to the presently illustrated embodiment, the photoluminescent structure 10 may be arranged as a multi-layered structure including an energy conversion layer 16, optional stability layer 20, and optional protective layer 22, as described above.

In some embodiments, a decorative layer 98 may be disposed between a overmold material 66 and the photoluminescent structure 10. However, the decorative layer 98 may be disposed in any other location within the lighting assembly 28 in alternate embodiments. The decorative layer 98 may include a polymeric material or any other suitable material and is configured to control or modify an appearance of the overmold material 66. For example, the decorative layer 98 may be configured to confer a metallic appearance to the viewable portion 64. The metallic appearance can be disposed rearwardly of the viewable portion 64 through any method known in the art, including, but not limited to, sputter deposition, vacuum deposition (vacuum evaporation coating), electroplating, or directly printing onto a component of the lighting assembly 28. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein.

In other embodiments, the decorative layer 98 may be tinted any color to confer any desired design on the vehicle structure on which the lighting assembly 28 is to be received. In any event, the decorative layer 98 may be at least partially light transmissible such that the converted light 26 is not prevented from illuminating the viewable portion 64.

A reflective layer 54 may also be disposed above the photoluminescent structure 10. The reflective layer 54 may include clear, translucent, and/or opaque portions and may be colored any desired color. The reflective layer 54 may include any retroreflective material that generally functions to reflect incident light 100 that is directed from the environment proximate the lighting assembly 28 towards the viewable portion 64. According to one embodiment, the reflective layer 54 is configured as a plurality of retroreflective beads 56. The beads 56 may be formed from a glass material, a polymeric material, and/or any other practicable material. In some embodiments, a portion of the beads 56 may be a first material (e.g., a glass) and a second portion of the beads 56 may be a second material (e.g., a polymeric material). The beads 56 may have a solid construction, or may be hollow. In embodiments where the beads 56 have a hollow core, the internal void may include any type of material, solid, liquid, or gas, without departing from the teachings provided herein. It will be appreciated that in alternate embodiments, retroreflective materials other than beads may be utilized within the retroreflective layer without departing from the teachings provided herein.

According to one embodiment, the material within the beads 56 may have a different refractive index than the material of the beads 56. The beads 56 may have a substantially spherical shape, an oblong shape, an irregular shape, or combinations thereof. The beads 56 may range in size from about 60 μm (0.0024 inches) to about 850 μm (0.034 inches). The bead size may be expressed in terms of U.S. Sieve number, or the size of mesh screen that a bead will pass through. For example, a U.S. Sieve Number 20 will permit beads 56 with a diameter of 840 μm (0.033 inches) or less to pass through the mesh, whereas a Number 200 mesh will allow those beads 56 of 74 μm (0.0029 inches) or less to pass. According to one embodiment, the beads 56 may be chosen from 20 to 200 U.S. Sieve Number. The beads 56, according to one embodiment, are substantially mono dispersed in size and/or shape. According to an alternate embodiment, the beads 56 may be configured in a variety of sizes and/or shapes that are randomly distributed within a light transmissive adhesive layer 58.

According to one embodiment, the reflective layer 54 may contain over 10, 100 or 1000 beads 56 per square foot that are bonded to the light-producing assembly 60 within the light transmissive adhesive layer 58. The beads 56 and/or adhesive layer 58 may be printed onto the light-producing assembly 60. Instead of scattering light, the retroreflective beads 56 may reflect incident light 100 (e.g., ambient light) and redirect the incident light 100 away from the light-producing assembly 60 thereby creating reflective characteristics. For the beads 56 to retroreflect light, the beads 56 may be partially transparent and substantially round. However, it will be understood that the beads 56 may be translucent and/or any other shape without departing from the teachings provided herein.

The transparency of the beads 56 may allow incident light 100, or ambient light, to pass into and be subsequently redirected out of the beads 56. As the incident light 100 enters the beads 56, it may be bent (refracted) by the rounded surface of the beads 56 to a point below where the beads 56 is embedded in the adhesive layer 58. The incident light 100 striking the back of the beads 56 surface, which is embedded within the adhesive layer 58, may then be reflected outwardly in a substantially convergent direction to which the incident light 100 entered the beads 56, with only a small fraction of the light going back toward the photoluminescent structure 10 and/or the light-producing assembly 60. In some embodiments, the decorative layer 98 and the adhesive layer 58 may be a single layer.

The beads 56 may be applied to the photoluminescent structure 10 and/or the light-producing assembly 60 in a premixed solution, disposed into the wet adhesive layer 58, dropped onto a premixed two-part epoxy or thermoplastic material, and/or through any other process known in the art. According to one embodiment, the beads 56 may be embedded to about greater than about 10%, 20%, 30%, 40%, 50% or 60% of the diameter of the beads 56. In other words, a portion of the beads 56 may protrude from the adhesive layer 58. It will be understood that multiple contiguous layers of beads 56 may be utilized within the paint such that some beads 56 are completely surrounded by the adhesive layer 58 while other beads 56 protrude. The depth of the beads 56 within the adhesive layer 58 may be consistent across the lighting assembly 28 or may vary across the lighting assembly 28 such that certain areas are highlighted. In some embodiments, it may be desired to provide a consistent quality of both beads 56 and the adhesive layer 58 to promote even retroreflectivity along the lighting assembly 28.

The retroreflected light from the beads 56 may be a function of three variables including the index of refraction of the beads 56; the bead 56 shape, size, and surface characteristics; and the number of beads 56 present and exposed to incident light 100. The bead's 56 Refractive Index (RI) is a function of the chemical makeup of the beads 56. The higher the RI, the more incident light 100 that is retroreflected. According to one embodiment, the beads 56 disposed on the light-producing assembly 60 have a refractive index in the range of 1 to 2.

The viewable portion 64 is arranged over the photoluminescent structure 10. In some embodiments, the viewable portion 64 may include a plastic, silicon, or urethane material and is molded over the reflective layer 54, the photoluminescent structure 10, and/or the light-producing assembly 60. Preferably, the viewable portion 64 should be at least partially light transmissible. In this manner, the viewable portion 64 will be illuminated by the photoluminescent structure 10 whenever an energy conversion process is underway.

Additionally, by over-sealing the viewable portion 64, it may also function to protect the photoluminescent structure 10 and the light-producing assembly 60. The viewable portion 64 may be arranged in a planar shape and/or an arcuate shape to enhance its viewing potential. Like the photoluminescent structure 10 and the light-producing assembly 60, the viewable portion 64 may also benefit from a thin design, thereby helping to fit the light source 36 into small package spaces of the vehicle 32.

The overmold material 66 is disposed around the light-producing assembly 60, the photoluminescent structure 10, and/or the reflective layer 54. According to one embodiment, the overmold material 66 may be disposed around a top portion of the retroreflective beads 56 and form some, or all, of the viewable portion 64. The overmold material 66 may protect the light-producing assembly 60 from a physical and chemical damage arising from environmental exposure. The overmold material 66 may have viscoelasticity (i.e., having both viscosity and elasticity), a low Young's modulus, and/or a high failure strain compared with other materials so that the overmold material 66 may protect the light-producing assembly 60 when contact is made thereto. For example, the overmold material 66 may protect the light-producing assembly 60 from the environmental containments, such as dirt and water that may come in contact with the body of the vehicle 32. It is also contemplated that the viewable portion 64 may be formed by a portion of the overmold material 66.

In some embodiments, the photoluminescent structure 10 may be employed separate and away from the light-producing assembly 60. For example, the photoluminescent structure 10 may be positioned on the rear bumper 44, a door 46 (FIG. 6), and/or any surface proximate, but not in physical contact with, the light-producing assembly 60. It should be understood that in embodiments where the photoluminescent structure 10 is incorporated into distinct components separated from the light source 36, the light source 36 might still have the same or similar structure to the light source 36 described in reference to FIG. 4A.

Figure 4B:
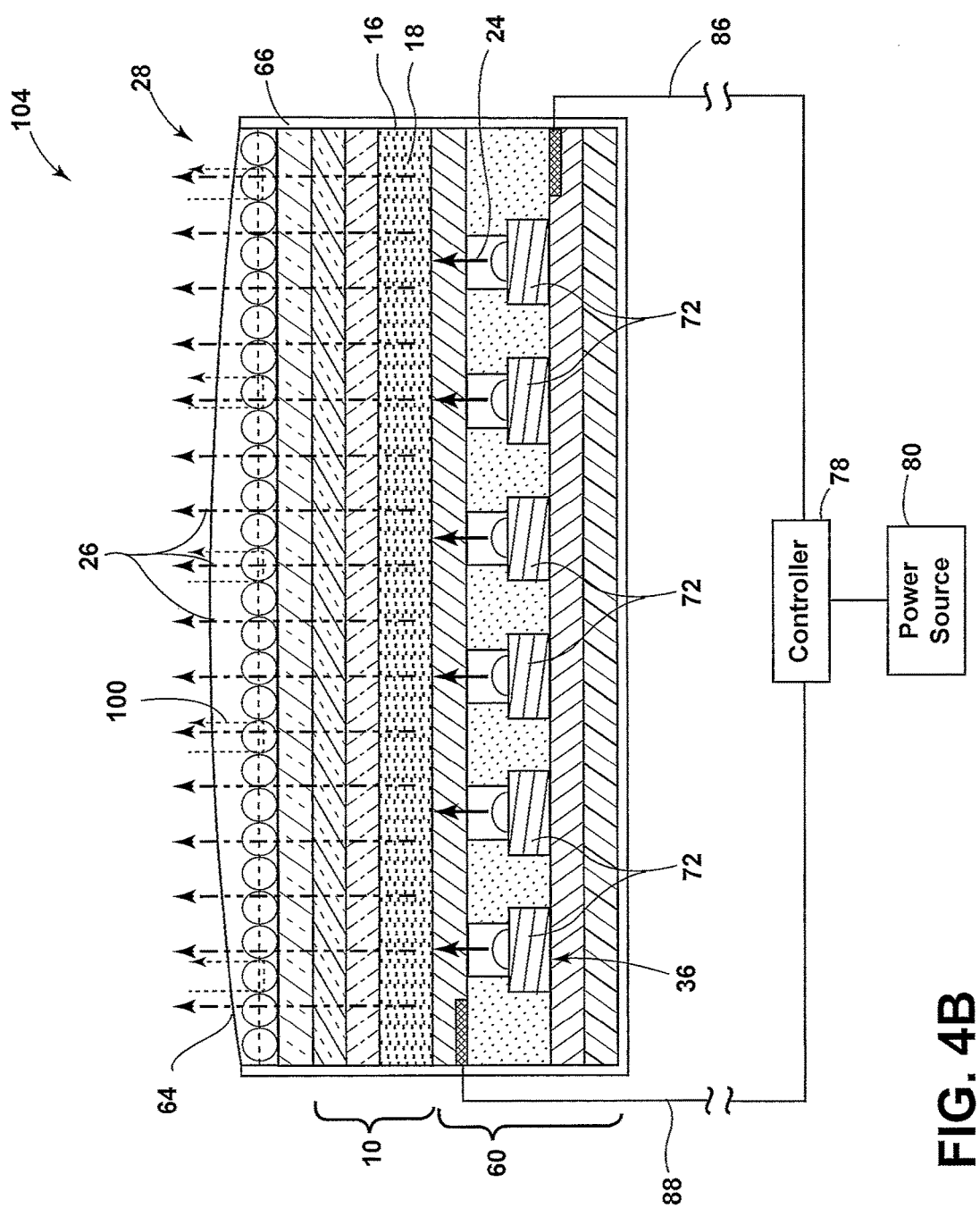
FIG. 4B is a cross-sectional view taken along line IV-IV of FIG. 2 further illustrating the light source, according to one embodiment.

Referring to FIG. 4B, an energy conversion process 104 for producing single color luminescence is illustrated according to one embodiment. For purposes of illustration, the energy conversion process 104 is described below using the light source 36 depicted in FIG. 4A. In this embodiment, the energy conversion layer 16 of the photoluminescent structure 10 includes a single photoluminescent material 18, which is configured to convert excitation light 24 received from LED sources 72 into an converted light 26 having a wavelength different than that associated with the excitation light 24. More specifically, the photoluminescent material 18 is formulated to have an absorption spectrum that includes the emission wavelength of the excitation light 24 supplied from the LED sources 72. The photoluminescent material 18 is also formulated to have a Stokes shift resulting in the visible converted light 26 having an emission spectrum expressed in a desired color, which may vary per lighting application. The visible converted light 26 is outputted from the light source 36 via the viewable portion 64, thereby causing the viewable portion 64 to illuminate in the desired color. The illumination provided by the viewable portion 64 may offer a unique, substantially uniform, and/or attractive viewing experience that may be difficult to duplicate through non-photoluminescent means.

Figure 4C:
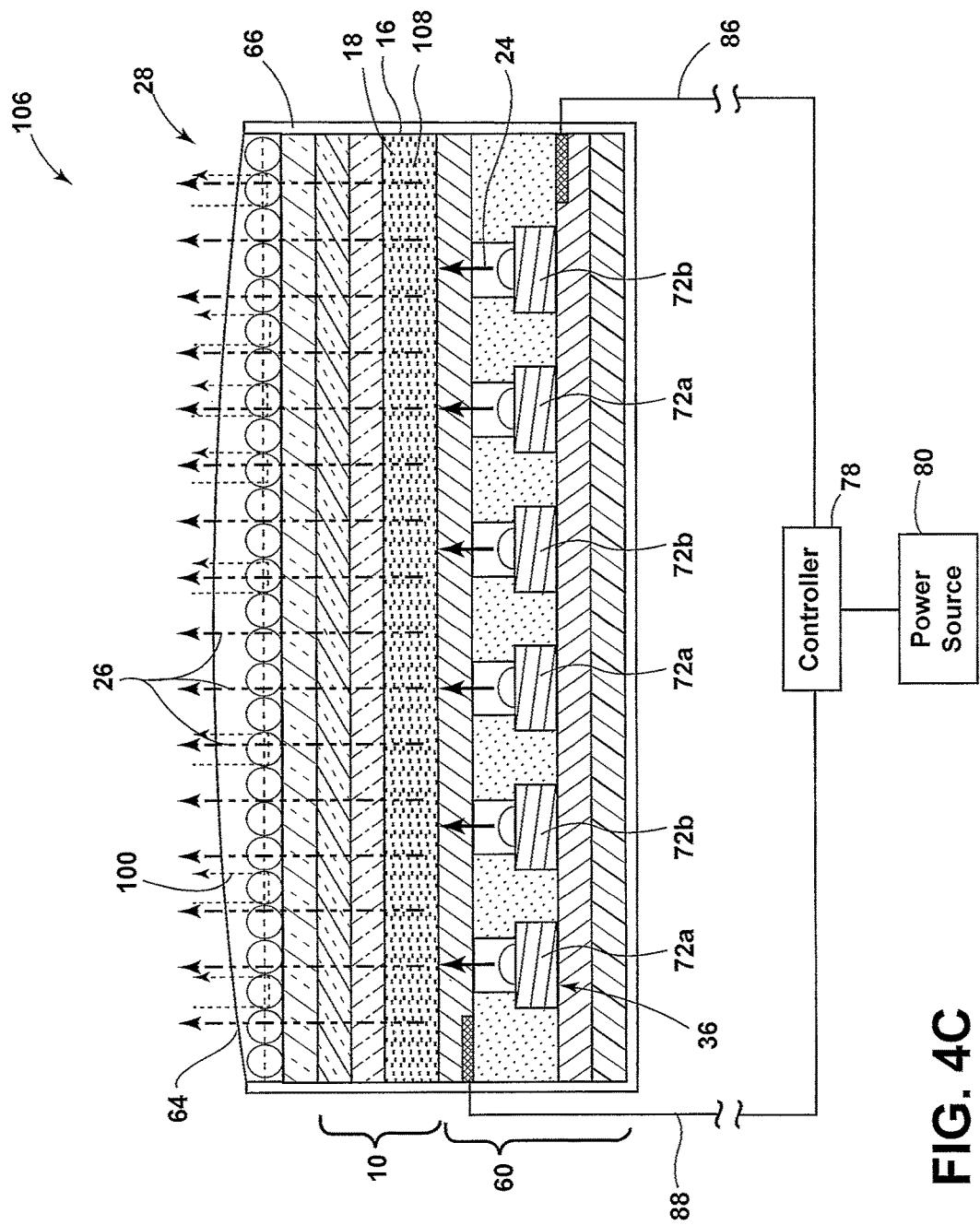
FIG. 4C is a cross-sectional view taken along line IV-IV of FIG. 2 illustrating an alternate light source, according to one embodiment.

Referring to FIG. 4C, a second energy conversion process 106 for generating multiple colors of light is illustrated according to one embodiment. For consistency, the second energy conversion process 106 is also described below using the light source 36 depicted in FIG. 4A. In this embodiment, the energy conversion layer 16 includes the first and second photoluminescent materials 18, 108 that are interspersed within the energy conversion layer 16. Alternatively, the photoluminescent materials 18, 108 may be isolated from each other if desired. Also, it should be appreciated that the energy conversion layer 16 may include more than two different photoluminescent materials 18 and 108, in which case, the teachings provided below similarly apply. In one embodiment, the second energy conversion process 106 occurs by way of down conversion using blue, violet, and/or UV light as the source of excitation.

With respect to the presently illustrated embodiment, the excitation of photoluminescent materials 18, 108 is mutually exclusive. That is, photoluminescent materials 18, 108 are formulated to have non-overlapping absorption spectrums and Stoke shifts that yield different emission spectrums. Also, in formulating the photoluminescent materials 18, 108, care should be taken in choosing the associated Stoke shifts such that the converted light 26 emitted from one of the photoluminescent materials 18, 108, does not excite the other, unless so desired. According to one exemplary embodiment, a first portion of the LED sources 72, exemplarily shown as LED sources 72a, is configured to emit an excitation light 24 having an emission wavelength that only excites photoluminescent material 18 and results in the excitation light 24 being converted into a converted light 26 of a first color (e.g., white). Likewise, a second portion of the LED sources 72, exemplarily shown as LED sources 72b, is configured to emit an excitation light 24 having an emission wavelength that only excites second photoluminescent material 108 and results in the excitation light 24 being converted into a converted light 26 of a second color (e.g., red). Preferably, the first and second colors are visually distinguishable from one another. In this manner, LED sources 72a and 72b may be selectively activated using the controller 78 to cause the photoluminescent structure 10 to luminesce in a variety of colors. For example, the controller 78 may activate only LED sources 72a to exclusively excite photoluminescent material 18, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 18, 108 to become excited, resulting in the viewable portion 64 illuminating in a third color, which is a color mixture of the first and second color (e.g., pinkish). The intensities of the excitation light 24 emitted from each light source 36 may also be proportionally varied to one another such that additional colors may be obtained. For energy conversion layers 16 containing more than two distinct photoluminescent materials 18, 108, a greater diversity of colors may be achieved. Contemplated colors include red, green, blue, and combinations thereof, including white, all of which may be achieved by selecting the appropriate photoluminescent materials 18 and correctly manipulating the corresponding LED sources 72.

Figure 4D:
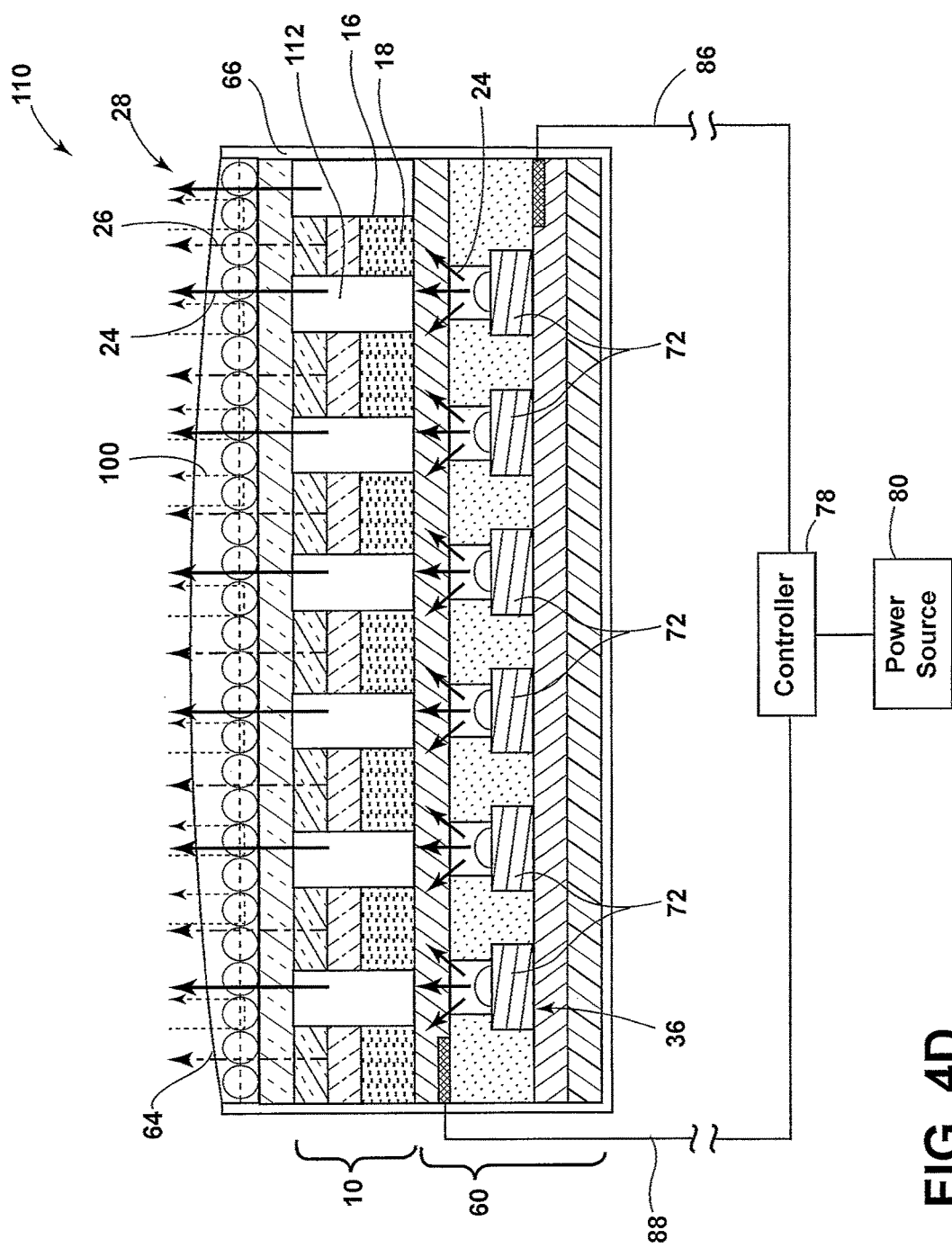
FIG. 4D is a cross-sectional view taken along line IV-IV of FIG. 2 illustrating a light source having a luminescent structure separated by light transmissive portions disposed on the light source, according to one embodiment.

Referring to FIG. 4D, a third energy conversion process 110 includes a light-producing assembly 60, such as the one described in reference to FIG. 4A, and a photoluminescent material 18 disposed thereon is illustrated, according to an alternate embodiment. The photoluminescent material 18 is configured to convert excitation light 24 received from LED sources 72 into a converted light 26 having a wavelength different than that associated with the excitation light 24. More specifically, the photoluminescent structure 10 is formulated to have an absorption spectrum that includes the emission wavelength of the excitation light 24 supplied from the LED sources 72. The photoluminescent material 18 is also formulated to have a Stokes shift resulting in the converted light 26 having an emission spectrum expressed in a desired color, which may vary per lighting application.

The photoluminescent structure 10 may be applied to a portion of the light-producing assembly 60, for example, in a stripped manner. Between the photoluminescent structures 10 may be light transmissive portions 112 that allow excitation light 24 emitted from the LED sources 72 to pass therethrough at the first wavelength. The light transmissive portions 112 may be an open space, or may be a transparent or translucent material. The excitation light 24 emitted through the light transmissive portions 112 may be directed from the light-producing assembly 60 towards a second photoluminescent structure 10 disposed proximate to the light-producing assembly 60. The second photoluminescent structure 10 may be configured to luminesce in response to the excitation light 24 that is directed through the light transmissive portions 112.

Figure 4E:
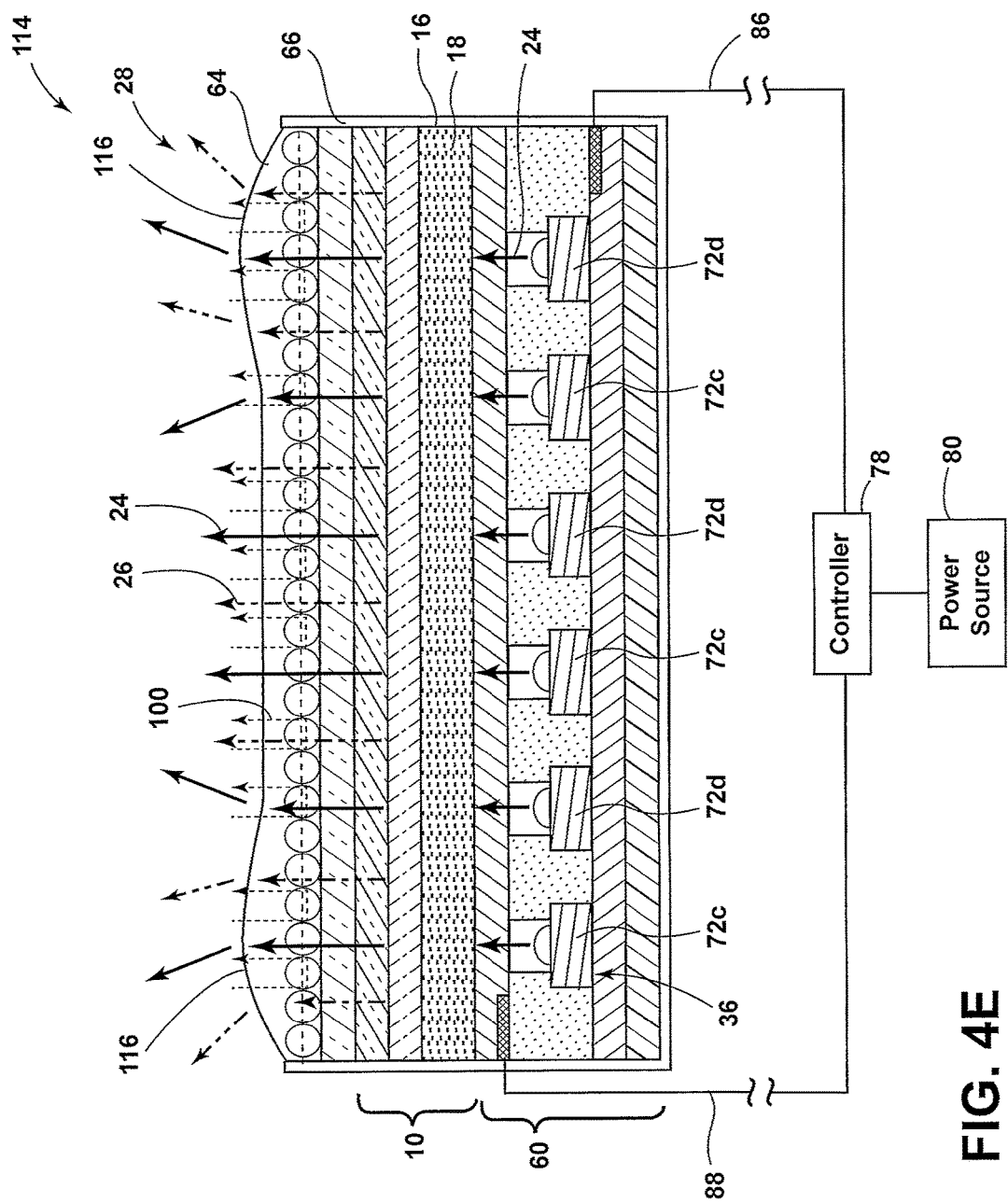
FIG. 4E is a cross-sectional view taken along line IV-IV of FIG. 2 illustrating an alternate light source having a luminescent structure disposed on the light source configured to convert a portion of light emitted from the light source from a first wavelength to a second wavelength, according to one embodiment.

Referring to FIG. 4E, a fourth energy conversion process 114 for generating multiple colors of light utilizing the light-producing assembly 60, such as the one described in reference to FIG. 4A, and a photoluminescent structure 10 disposed thereon is illustrated. In this embodiment, the photoluminescent structure 10 is disposed over a top portion of the light-producing assembly 60. The excitation of photoluminescent material 18 is formulated such that a portion of excitation light 24 emitted from the LED sources 72 passes through the photoluminescent structure 10 at the first wavelength (i.e., the excitation light 24 emitted from the light source 36 is not converted by the photoluminescent structure 10). The intensity of the outputted light (i.e., the combination of the excitation light 24 and converted light 26) may be modified by pulse-width modulation or current control to vary the amount of excitation light 24 emitted from the LED sources 72 that passes through the photoluminescent structure 10 without converting to a second, converted 26 wavelength. For example, if the light source 36 is configured to emit excitation light 24 at a low level, substantially all of the excitation light 24 may be converted to converted light 26. In this configuration, a color of excitation light 24 corresponding to the photoluminescent structure 10 may be emitted from the light-producing assembly 60. If the light source 36 is configured to emit excitation light 24 at a high level, only a portion of the first wavelength may be converted by the photoluminescent structure 10. In this configuration, a first portion of the outputted light may be converted by the photoluminescent structure 10 and a second portion of the outputted light may be emitted from the light-producing assembly 60 at the first wavelength towards additional photoluminescent structures 10 disposed proximately to the light source 36. The additional photoluminescent structures 10 may luminesce in response to the excitation light 24 emitted from the light source 36.

According to one exemplary embodiment, a first portion of the LED sources 72, exemplarily shown as LED sources 72a is configured to emit an excitation light 24 having a wavelength that excites the photoluminescent material 18 within the photoluminescent structure 10 and results in the excitation light 24 being converted into a converted light 26 of a first color (e.g., white). Likewise, a second portion of the LED sources 72, exemplarily shown as LED sources 72c, is configured to emit an excitation light 24 having a wavelength that passes through the photoluminescent structure 10 and excites additional photoluminescent structures 10 disposed proximately to the lighting assembly 28 thereby illuminating in a second color. The first and second colors may be visually distinguishable from one another. In this manner, LED sources 72a and 72c may be selectively activated using the controller 78 to cause the lighting assembly 28 to luminesce in a variety of colors.

The light-producing assembly 60 may also include optics 116 that are configured to direct excitation light 24 emitted from the LED sources 72a, 72c and the converted light 26 emitted from the photoluminescent structure 10 towards pre-defined locations. For example, excitation light 24 emitted from the LED sources 72a, 72c and the photoluminescent structure 10 may be directed and/or focused towards the ground and/or outwardly towards approaching vehicles 50.

Figure 5:
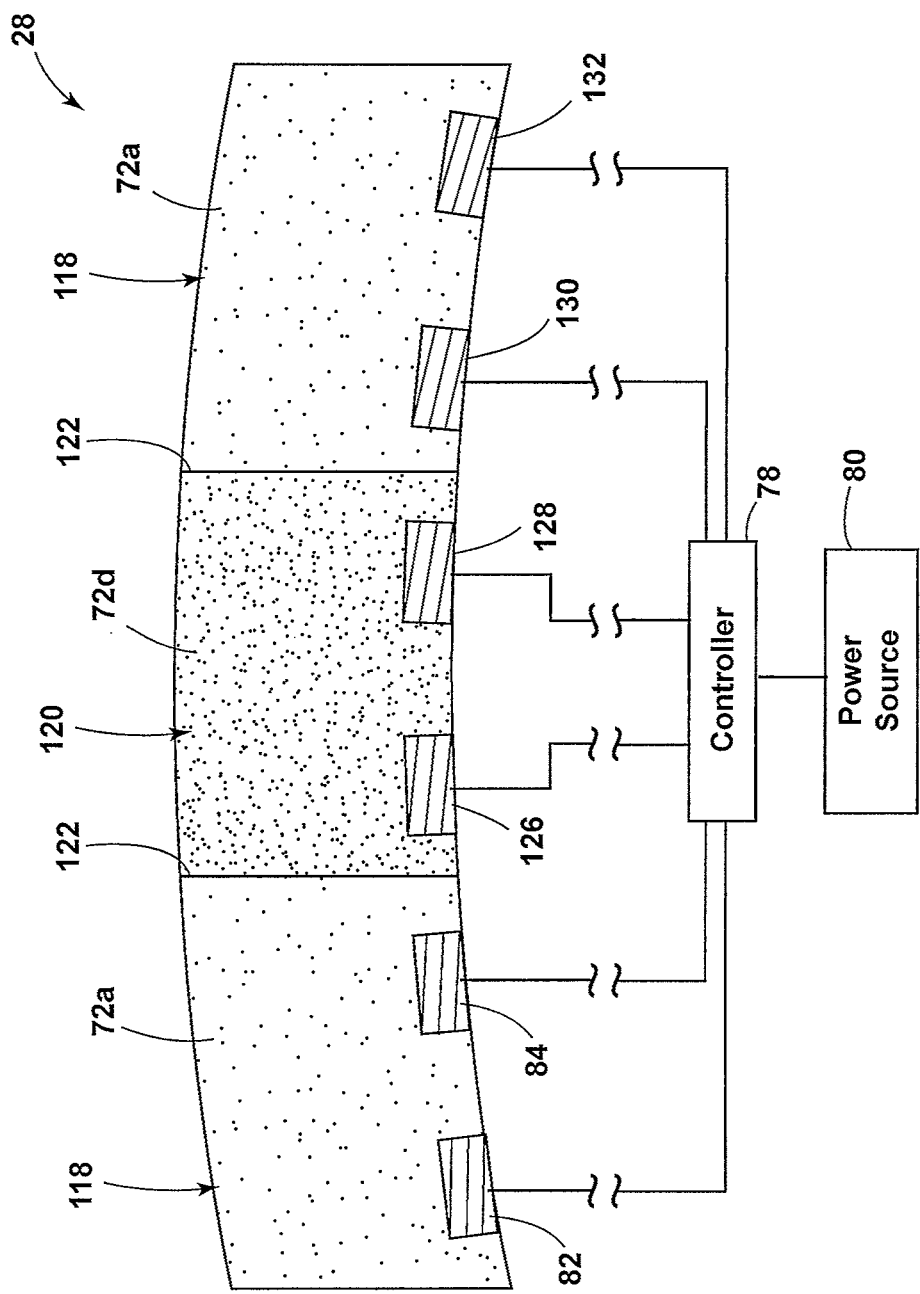
FIG. 5 illustrates a top view of a light-producing assembly, according to one embodiment, having varying types and concentrations of LED sources transversely along the light-producing assembly.

Referring to FIG. 5, a light-producing assembly 60, according to one embodiment, is illustrated from a top view having varying types and concentrations of LED sources 72a, 72d transversely along the light-producing assembly 60. As illustrated, a first portion 118 of the light-producing assembly 60 includes LED sources 72a that are configured to emit an excitation light 24 having an emission wavelength in a first color (e.g., red) spectrum. Likewise, a second portion 120 of the light-producing assembly 60 includes LED sources 72d that are configured to emit an excitation light 24 having an emission wavelength in a second color (e.g., orange) spectrum. The first and second portions 118, 120 of the light-producing assembly 60 may be separated by insulative, or non-conductive, barriers 122 from proximately disposed portions through any means known in the art such that each portion 118, 120 may be illuminated independently of any other portion 118, 120. The insulative barriers 122 may also prevent a substantial amount of excitation light 24 from proximately illuminated LED sources 72*a*, 72*d* from crossing through the insulative barrier 122. Further, each portion 118, 120 disposed within the light-producing assembly 60 may include a respective bus bar 82, 84, 126, 128, 130, 132 coupled to the controller 78 and configured to illuminate each respective portion 118, 120.

According to one non-limiting embodiment, each portion 118, 120 may include an independent power input and a common ground. The common ground may be a silver conductive ink that is electrically coupled to a copper foil of aluminum ground plane to assist in the dissipation of heat. It will be appreciated that any other material may be used for providing power to the lighting assembly 28 and to ground the lighting assembly 28.

According to one embodiment, the first and second colors are visually distinguishable from one another. In this manner, LED sources 72*a* and 72*d* may be selectively activated using the controller 78 to cause the LED sources 72*a*, 72*d* to illuminate in a variety of colors. For example, the controller 78 may activate only LED sources 72*a* to exclusively illuminate a portion 118 of the light-producing assembly 60 in the first color. Alternatively, the controller 78 may activate only LED sources 72*d* to exclusively illuminate a portion 120 of the light-producing assembly 60 in the second color. It should be appreciated that the light-producing assembly 60 may include any number of portions 118, 120 having varying LED sources 72*a*, 72*d* that may illuminate in any desired color. Moreover, it should also be appreciated that the portions having varying LED sources 72*a*, 72*d* may be orientated in any practicable manner and need not be disposed adjacently.

As described above, a photoluminescent structure 10 may be disposed on a portion of the light-producing assembly 60. If desired, any of the LED sources 72*a*, 72*d* may be utilized for exciting any photoluminescent material 18 disposed proximately to and/or above the light-producing assembly 60.

The semiconductor ink 74 may also contain various concentrations of LED sources 72*a*, 72*d* such that the concentration of the LED sources 72*a*, 72*d*, or number of LED sources 72*a*, 72*d* per unit area, may be adjusted for various lighting applications. In some embodiments, the concentration of LED sources 72*a*, 72*d* may vary across the length of the light-producing assembly 60. For example, a first portion 118 of the light-producing assembly 60 may have a greater concentration of LED sources 72 than alternate portions 120, or vice versa. In such embodiments, the light source 36 and/or the indicia may appear brighter or have a greater luminance in order to preferentially illuminate pre-defined locations. In other embodiments, the concentration of LED sources 72*a*, 72*d* may increase or decrease with increasing distance from a preselected point.

According to one embodiment, the light-producing assembly 60 includes a higher concentration of LED sources 72*a* in the second portion 120 such that the second portion 120 may illuminate as a first identifier, such as when the vehicle 32 is approaching a delivery location and therefore will soon be stopping. The first portion 118 may illuminate as a second indicator, such as when the vehicle 32 intends to increase in vehicle speed after delivering an item.

Figure 6:
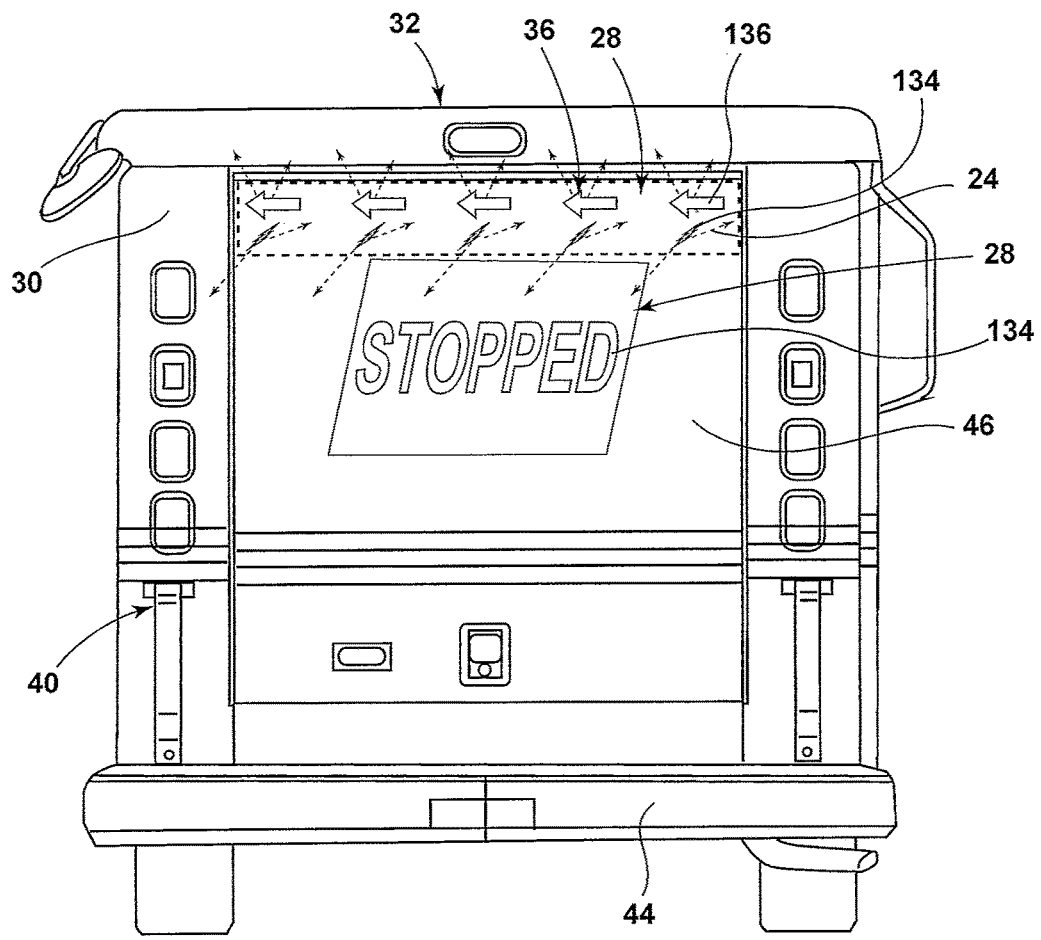
FIG. 6 illustrates a rear perspective view of the vehicle having the lighting assembly attached to the vehicle and having one or more illuminable messages disposed thereon, according to one embodiment.

Referring to FIG. 6, the decorative layer 98 of the lighting assembly 28 may be configured to illuminate messages 134 and/or arrows 136 as portions 118, 120 of the lighting assembly 28 are illuminated. The messages 134 may be opaque symbols on the decorative layer 98 that are backlit when the light-producing assembly 60 is illuminated and/or as an energy conversion process in underway by the photoluminescent structure 10. For example, messages 134 such as "stopped" and "frequent stops" may illuminate to warn approaching vehicles 50 of the pending change in vehicular condition. Each message 134 disposed within the lighting assembly 28 may be provided on any portion of the vehicle 32.

Additionally, or alternatively, the arrows 136 may illuminate in any sequence or confer a plurality of messages 134. For example, one or more arrows 136 may sequentially illuminate to alert approaching vehicles 50 of the slow moving vehicle 32 and that the approaching vehicles 50 should pass the slow moving vehicle 32 on the left side of the vehicle 32.

According to one embodiment, the lighting assembly 28 may illuminate in one or more predefined illumination sequences stored within the controller 78. The illumination sequences may automatically illuminate based on the position of a wireless transmitter disposed on or with the occupant 38 of the vehicle 32 and/or based on predefined vehicular conditions. For example, when the occupant 38 of the vehicle 32 exits to deliver an item, the portion of the lighting assembly 28 may flash to indicate that the vehicle 32 is parked and currently unattended.

Alternatively, the occupant 38 of the vehicle 32 may separately turn on or off the lighting assembly 28. As another alternative, the illumination may respond to the vehicle's transmission state, e.g., park, drive, etc. Alternatively still, the lighting assembly 28 may automatically illuminate based on inputs from one or more vehicle sensors 138, as will be described in greater detail below.

Figure 7:
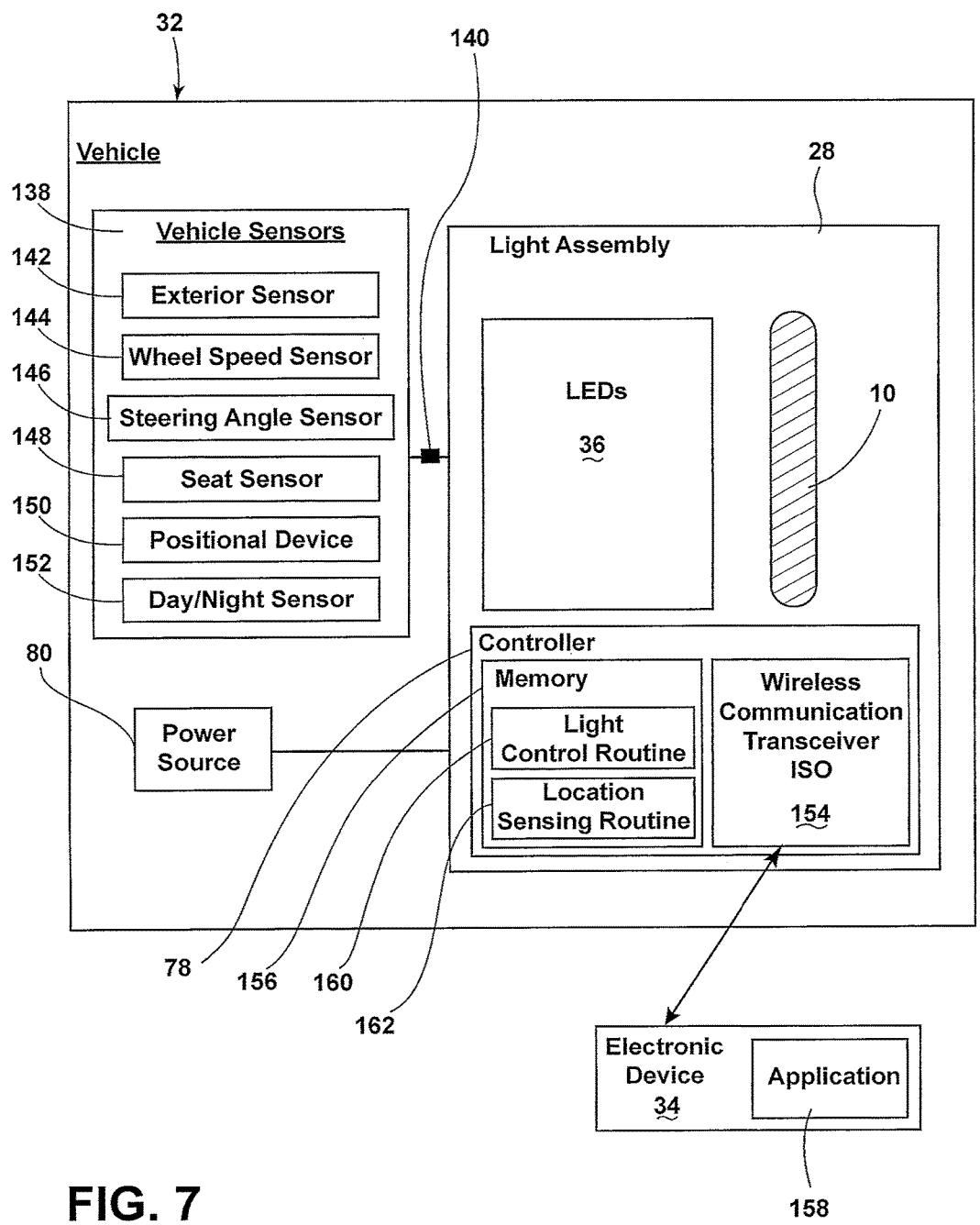
FIG. 7 is a block diagram of the vehicle, having the lighting assembly and the lighting control.

Referring to FIG. 7, a block diagram of the vehicle 32 is shown in which the lighting assembly 28 is positioned on the vehicle 32. As explained above, the power source 80 is connected to the lighting assembly 28 to provide power to the light source 36 within the lighting assembly 28. The lighting assembly 28, and the vehicle 32, may also be equipped with one or more sensors for detecting if the occupant 38 and electronic device 34 are near the vehicle 32.

The one or more vehicle sensors 138 that may be used in conjunction with the lighting assembly 28 may communicate with the lighting assembly 28 through a multiplex communication bus 140. The multiplex communication bus 140 may be disposed within the lighting assembly 28 and/or the vehicle 32. For example, the vehicle 32 may include an exterior sensor(s) 142, a wheel speed sensor 144, a steering angle sensor 146, a seat sensor 148, a positional device 150, a day/night sensor 152, and/or any other sensor that may be disposed within a vehicle 32.

The lighting assembly 28, or the vehicle 32, may further include one or more of the wireless communication transceivers 154 that may be configured to interact with the electronic device 34. The wireless communication transceivers 154 may communicate with the electronic device 34 over a wireless signal (e.g., radio frequency). In one non-limiting example, the wireless communication transceivers 154 may be a Bluetooth™ RN4020 module, or an RN4020 Bluetooth™ low energy PICtail board configured to communicate with the electronic device 34 using Bluetooth™ low energy signals. The wireless communication transceivers 154 may include a transmitter and a receiver to transmit and receive wireless signals (e.g., Bluetooth™ signals) to and from the electronic device 34. It will be appreciated that the wireless communication transceivers 154 may utilize other forms of wireless communication between with the electronic device 34 and other wireless communication transceivers 154 such as Wi-Fi™.

The wireless communication transceivers 154 may be positioned on or within the controller 78. The controller 78 may be a dedicated controller or may be a shared controller (e.g., for multiple light assemblies or light assemblies for other body features). The controller 78 may include a processor and a memory 156 for executing stored routines or for storing information (e.g., related to the operation of the lighting assembly 28 and/or the electronic device 34). The wireless communication transceiver 154 is configured to communicate with the processor such that one or more of the routines stored in the memory 156 is activated.

The electronic device 34 may include one or more routines, which control the communication between the wireless communication transceiver 154 and the electronic device 34. For example, in DIAD embodiments of the electronic device 34, the DIAD may include one or more applications 158 configured to communicate with the wireless communication transceivers 154. In the depicted embodiment, the memory 156 of the controller 78 includes a light control routine 160 and a location sensing routine 162. In various embodiments, the wireless communication transceivers 154 is a standalone device that is not in communication with body control modules, electronic control modules, engine control modules and/or other features of the vehicle 32. For example, the wireless communication transceivers 154 may only be capable of communication with the lighting assembly 28 and the electronic device 34. In other embodiments, the wireless communication transceivers 154 may communicate with the body controller 78 and/or other onboard controllers.

The vehicle 32 may include a plurality of wireless communication transceivers 154, similar to that described in connection with the lighting assembly 28, positioned around the vehicle 32 (e.g., a rear, sides, or front of the vehicle 32). The wireless communication transceivers 154 may be in communication with one another or may mutually communicate with a master controller or module (e.g., body control module). The wireless communication transceivers 154 may be disposed within other accessories of the vehicle 32, or may be stand alone units. The electronic device 34 may communicate with all, some, or none of the wireless communication transceivers 154 as the electronic device 34 enters and exits the communication range of the transceivers 154. Each of the wireless communication transceivers 154 may be aware of its location within the vehicle 32 and capable of sharing its location with the electronic device 34.

In various embodiments, the wireless communication transceivers 154 are capable of communicating with the electronic device 34 such that the location of the electronic device 34 may be determined therefrom (e.g., based on signal strength and/or return time of the signal) or vice versa. According to one embodiment, the location sensing routine 162 in the memory 156 of the controller 78 may utilize the signal strength and time to return of the signals between the plurality of wireless communication transceivers 154 and the electronic device 34 to triangulate the position of the electronic device 34 as the occupant 38 moves around and inside and/or outside of the vehicle 32. In embodiments where the wireless communication transceivers 154 communicate with a master module, the location of the electronic device 34 may be calculated in the master module. The location of the electronic device 34 may have sufficient resolution to determine which seat within the vehicle 32 the occupant 38 is approaching or sitting in. The electronic device 34 may then share its determined location with the wireless communication transceivers 154 such that appropriate features (e.g., message 134 illumination) may be activated by the appropriate transceivers 154. It will be understood that the location sensing routine 162 may be located on the electronic device 34 and that any location determinations may be made by the electronic device 34 and shared with the wireless communication transceivers 154 without departing from the spirit of this disclosure.

The light control routine 160 may process signals from the wireless communication transceiver 154 (e.g., the location of the electronic device 34) to activate the lighting assembly 28. Depending on the signals received from the wireless communication transceiver 154 and/or the vehicle sensors 138, the light control routine 160 may be activated. The light control routine 160 may store a predetermined illumination sequence for the lighting assembly 28 based on detected properties of the electronic device 34 (e.g., known or unknown device, location, and user specific data). For example, the light control routine 160 may control the lighting assembly 28 to follow the electronic device 34 by activating an illumination sequence based on the position of the electronic devices 34. The electronic device 34 may store user specific data and preferences relating to the lighting assembly 28 (e.g., color, intensity, pattern, activation distance, etc.) and/or the memory 156 (e.g., the light control routine 160) may store this data.

Choosing which electronic devices 34 should be trusted, and, therefore, given access to command of the controller 78 and/or the wireless communication transceiver 154 (e.g., the lighting assembly 28) may be determined based on whether the electronic device 34 has been inside of the vehicle 32 before. The memory of the wireless communication transceivers 154 may store identifying information relating to electronic devices 34 which were detected within the vehicle 32 (e.g., using the location sensing routine 162) and which may therefore be generally regarded as "friendly" and/or as the owner of the vehicle 32.

In an exemplary method of determining that an unknown electronic device 34 is friendly, the wireless communication transceivers 154 detect the presence of an unknown electronic device 34, detect a characteristic signal shift (e.g., attenuation or increase in signal at corresponding wireless communication transceivers 154) indicative of the unknown electronic device 34 entering or being within the vehicle 32 across multiple wireless communication transceivers 154, and store characteristic information about the electronic device 34 for future identification. It will be understood that a determination of the location of the electronic device 34 to be within the vehicle 32 may also prompt a storing of the characteristic information about the electronic device 34 for future identification. Utilizing the past and/or present location of the electronic device 34 as a security feature to determine if it is allowed access to the controller 78 may be particularly advantageous as the replication of signal shifting indicative of the electronic device 34 entering the vehicle 32 and the location of the electronic device 34 is particularly difficult to fake. Further, it will be understood that more conventional methods of connecting electronic devices 34, such as pairing and manually connecting, may also be utilized to designate friendly devices 34.

In some embodiments, the items to be delivered may have electronic devices 34 thereon that also communicate with the lighting assembly 28 and/or the positional device 150. According to one embodiment, the electronic devices 34 are programmed such that the item having the electronic devices 34 thereon is delivered to a proper location. Once the vehicle 32 arrives at the programmed location, the lighting assembly 28 may illuminate in a first color if the proper package is removed from the vehicle 32. The lighting assembly 28 may illuminate in a second color if the package is removed from the vehicle 32 at an improper location. Such a system may assist in proper delivery of items and act as a theft deterrent since the lighting assembly 28 will be illuminated when the package is improperly removed from the vehicle 32.

Integration of vehicle sensors 138 and/or detection of the electronic devices 34 by the wireless communication transceivers 154 may allow for a variety of lighting controls to be affected and illumination sequences to be activated. As described herein, the electronic devices 34 may be used for determining a location of the occupant 38. Accordingly, the lighting assembly 28 may illuminate in a first illumination sequence while the occupant 38 is disposed in the driver's seat. Alternatively, the lighting assembly 28 may illuminate in a second illumination sequence when the occupant 38 is determined to not be in the vehicle 32 and/or is determined to be in any other location within the vehicle 32.

According to one embodiment, the rate at which a portion of the lighting assembly 28 flashes may correspond to a speed sensed by the vehicle speed/wheel sensors 144. For instance, a portion of the lighting assembly 28 may flash automatically when the vehicle 32 is traveling at any rate under a first predefined speed (e.g., 25 miles per hour). Additionally, or alternatively, a portion of the lighting assembly 28 may maintain a constant illumination pattern when the vehicle 32 exceeds the first predefined speed, or a second predefined speed. Moreover, the color of the lighting assembly 28 may change from a first color (e.g., amber) to a second color (e.g., red) when the vehicle 32 is traveling below a third predefined speed. Any number of predefined speeds may be stored and any illumination sequence may be altered based on the predefined speed without departing from the teachings provided herein.

The seat sensor 148, which includes, but is not limited to, any type of proximity sensor, seat airbag sensor, pressure sensor, etc., may be utilized for initiating an illumination sequence of the lighting assembly 28. For example, if the occupant 38 is not disposed on the driver's seat, the lighting assembly 28 may illuminate in a predefined color (e.g. red). The lighting assembly 28 may return to an unilluminated state once the occupant 38 returns to the vehicle 32.

The lighting assembly 28 may also illuminate in conjunction with any standard illumination devices disposed on and/or within the vehicle 32. For example, the light source 36 may illuminate with, or instead of, the vehicle's turn indicators. Additionally, or alternatively, a portion of the lighting assembly 28 may illuminate that corresponds with a magnitude of rotation of the steering wheel through usage of the steering angle sensor 146. For instance, if the steering wheel is rotated more than 10 degrees to the left, a corresponding portion on the left side of the lighting assembly 28 becomes illuminated.

Any exterior sensor(s) 142, such as ultrasonic sensors or imaging sensors, may be disposed around the exterior of the vehicle 32 and used to provide information to approaching vehicles 50. For example, is a roadway is too narrow for an approaching vehicle to pass (e.g., less than 8 feet wide), the lighting assembly 28 may emit excitation light 24 and/or converted light 26 at a higher intensity, such as 5 times normal intensity, and at a 20% duty cycle to increase visibility of the vehicle 32. Moreover, the vehicle's headlights 164 (FIG. 2) may illuminate in conjunction with the lighting assembly 28 to further alert approaching vehicles 50.

A positional device 150 disposed onboard the vehicle 32, such as a navigation apparatus or any other positional device 150, may also be used in conjunction with the lighting assembly 28. According to one embodiment, the positional device 150 may direct the occupant 38 of the vehicle 32 to each subsequent delivery. Accordingly, as the vehicle 32 approaches a predetermined item delivery location, the lighting assembly 28 may automatically activate.

A day/night sensor 152 may be utilized for varying the intensity of excitation light 24 emitted from the light source 36. The day/night sensor 152 may be integrated into the vehicle 32 or into the lighting assembly 28. Moreover, the intensity of excitation light 24 may additionally, or alternatively, be varied with the initiation of the vehicle's headlights 164.

In embodiments where the lighting assembly 28 is divided into multiple elongate portions, each portion of the lighting assembly 28 may have separate optics (e.g., optics 116) such that independent activation of the elongate portions may change the direction or throw of the outputted light.

Detection of location of the electronic device 34 relative to the vehicle 32 also permits the wireless communication transceivers 154 to determine if an unrecognized electronic device 34 is proximate the vehicle 32. Such an unrecognized electronic device 34 may be owned or carried by a potential burglar or threat to the vehicle 32.

In events where an unrecognized electronic device 34 is detected proximate the vehicle 32 for greater than a predetermined time, the wireless communication transceivers 154 may activate one or more counter measures. Countermeasures may include a strobe light from the lighting assembly 28 or directing light from the electronic device 34. In some embodiments, any available identifying information about the electronic device 34 may be stored for later retrieval if the owner of the vehicle's electronic device 34 is not detected proximate the vehicle 32 at the same time. The wireless communication transceivers 154 may store greater than fifty electronic devices 34 that may have been a threat. Finally, the use of the lighting assembly 28 on the vehicle 32 may allow for a plurality of lighting solutions to be provided for the reversing or backing up of the vehicle 32. For example, the shifting of the vehicle 32 into a reverse gear may cause activation of the lighting assembly 28 to provide greater illumination for the driver or for a backup camera of the vehicle 32.

In operation, each photoluminescent structure 10 may exhibit a constant unicolor or multicolor illumination. For example, the controller 78 may prompt the light source 36 to emit only a first wavelength of excitation light 24 via the LED sources 72 to cause the photoluminescent structure 10 to illuminate in the first color (e.g., amber). Alternatively, the controller 78 may prompt the light source 36 to emit only a second wavelength of excitation light 24 via the LED sources 72 to cause the photoluminescent structure 10 to illuminate in the second color (e.g., red). Alternatively still, the controller 78 may prompt the light source 36 to simultaneously emit the first and second wavelengths of excitation light 24 to cause the photoluminescent structures 10 to illuminate in a third color (e.g., pinkish) defined by an additive light mixture of the first and second colors. Moreover, additional photoluminescent structures 10 may be added to the lighting assembly 28 that convert the excitation light 24 emitted from the light source 36 to a different wavelength. Alternatively still, the controller 78 may prompt the light source 36 to alternate between periodically emitting the first and second wavelengths of excitation light 24 to cause the photoluminescent structure 10 to periodically illuminate by alternating between the first and second colors of converted light 26. The controller 78 may prompt the light source 36 to periodically emit the first and/or second wavelengths of excitation light 24 at a regular time interval and/or an irregular time interval.

With respect to the above examples, the controller 78 may modify the intensity of the emitted first and second wavelengths of excitation light 24 by pulse-width modulation or current control. In some embodiments, the controller 78 may be configured to adjust a color of the converted light 26 by sending control signals to adjust an intensity or energy output level of the light source 36. For example, if the light source 36 is configured to output the excitation light 24 at a low level, substantially all of the excitation light 24 may be converted to the outputted, visible converted light 26. If the light source 36 is configured to emit excitation light 24 at a high level, only a portion of the excitation light 24 may be converted to the converted light 26 by the photoluminescent structure 10. In this configuration, a color of light corresponding to mixture of the excitation light 24 and the converted light 26 may be output as the outputted light. In this way, each of the controllers 78 may control an output color of the outputted light.

Though a low level and a high level of intensity are discussed in reference to the excitation light 24, it shall be understood that the intensity of the excitation light 24 may be varied among a variety of intensity levels to adjust a hue of the color corresponding to the emitted excitation and/or converted light 24, 26 from the lighting assembly 28. As described herein, the color of the converted light 26 may be significantly dependent on the particular photoluminescent material 18 utilized in the photoluminescent structure 10. Additionally, a conversion capacity of the photoluminescent structure 10 may be significantly dependent on a concentration of the photoluminescent structures 10 utilized in the photoluminescent structure 10. By adjusting the range of intensities that may be emitted from the light source 36, the concentration and proportions of the photoluminescent materials 18 in the photoluminescent structure 10 and the types of photoluminescent materials 18 utilized in the photoluminescent structure 10 discussed herein may be operable to generate a range of color hues of outputted light by blending the excitation light 24 with the converted light 26. It is also contemplated that the intensity of each light source 36 may be varied simultaneously, or independently, from any number of other light sources 36.

A variety of advantages may be derived from the use of the present disclosure. For example, use of the disclosed lighting assembly 28 may allow for consistent lighting of the exterior portion of the vehicle 32 (e.g., to drape light across the rear vehicle 32 in a wash light manner) and provide additional information to approaching vehicles 50. The even lighting may be accomplished by the use of thousands of the LED sources 72. Further, use of the wireless communication transceivers 154 allows for the lighting assembly 28 to be activated as a person approaches. Further, due to the low package space requirements of the lighting assembly 28, the lighting assembly 28 may be adhesively bonded within any exterior portion of the vehicle 32. Finally, use of the wireless communication transceivers 154 allows for a low consumption of power from the vehicle 32 while the vehicle 32 is not in use.

For the purposes of describing and defining the present teachings, it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
   a panel having a plurality of light sources arranged thereon;
   a first vehicle sensor configured to initiate an illumination sequence as the vehicle approaches a predefined location as determined by a navigation device; and
   a controller configured to illuminate the plurality of light sources when an electronic device is detected by a transceiver, wherein the electronic device is proximate said vehicle and characteristic information about the electronic device has not been previously stored in a memory of the transceiver, and further wherein the controller illuminates the plurality of light sources by sending control signals to adjust an intensity or energy output level of the plurality of light sources by a light control routine in response to detection of the electronic device by the transceiver.

2. The vehicle of claim 1, further comprising:
   a second vehicle sensor which is a seat sensor that communicates with the controller such that the plurality of light sources automatically illuminate when a vehicle engine is running and a seat monitored by the seat sensor is unoccupied.

3. The vehicle of claim 1, wherein the panel includes a door and the plurality of light sources extend from a vehicle forward portion to a vehicle rearward portion of the door.

4. The vehicle of claim 1, further comprising:
a photoluminescent structure including at least one photoluminescent material therein configured to convert an excitation light received from the plurality of light sources into a visible converted light, the photoluminescent structure disposed between the plurality of light sources and a decorative layer.

5. The vehicle of claim 1, further comprising:
a decorative layer disposed above the photoluminescent structure and having opaque portions that are backlit to confer messages to an approaching vehicle.

6. The vehicle of claim 1, wherein the plurality of light sources is configured to illuminate in a plurality of colors based on a speed of the vehicle.

7. The vehicle of claim 1, wherein the plurality of light sources extends along a side portion of the vehicle.

8. The vehicle of claim 1, wherein the plurality of light sources is disposed on a rear door of the vehicle.

9. A vehicle, comprising:
an exterior body panel having a first plurality of light sources extending along an exterior surface thereof and a door having a second plurality of light sources extending along an exterior surface of the door from a first end to a second end portion thereof, the first and second plurality of light sources vertically aligned and oriented in a substantially constant direction;
a sensor; and
a controller configured to activate the plurality of light sources based on a location of an electronic device within or outside of said vehicle, wherein a transceiver communicates with the electronic device to determine the location of the electronic device.

10. The vehicle of claim 9, wherein the controller includes one or more wireless communication transceivers for detecting the electronic device in the possession of an occupant and determining the location of the electronic device.

11. The vehicle of claim 10, wherein the wireless communication transceiver is configured to directly communicate with the lighting assembly and the electronic device, the wireless communication transceiver disposed within the light assembly and disposed on an exterior portion of the vehicle.

12. The vehicle of claim 10, wherein the light sources illuminate in a first color when the electronic device is removed from the vehicle at a proper location and in a second color when the electronic device is removed from the vehicle at an improper location.

13. A vehicle, comprising:
a rear panel facing in a vehicle rearward direction and having a first plurality of light sources extending along an exterior surface thereof and a rear door having a second plurality of light sources extending along an exterior surface thereof, the first and second plurality of light sources vertically aligned with the door in a closed position;
a photoluminescent structure disposed on the light source and configured to luminesce in response to excitation by the light source;
a vehicle sensor disposed on the vehicle, wherein the vehicle sensor includes a positional device; and
a controller configured to initiate an illumination sequence of the light source based on said vehicle approaching a predefined locational destination as sensed by the positional device.

14. The vehicle of claim 13, wherein the photoluminescent structure luminesces in the white color spectrum while the vehicle is in motion.

15. The vehicle of claim 13, wherein the light source includes LED sources dispersed in a printed LED arrangement that are each configured to emit an excitation light.

16. The vehicle of claim 13, wherein the vehicle sensor is a positional device that communicates with the controller such that the light source automatically illuminates when a vehicle approaches a predefined location.

17. The vehicle of claim 13, wherein the photoluminescent structure comprises at least one photoluminescent material configured to perform an energy conversion on an excitation light received from at least a portion of the light source into a visible, converted light that is outputted to a viewable portion.

18. The vehicle of claim 13, wherein the vehicle sensor is a steering angle sensor that communicates with the controller such that the light source automatically illuminates when a vehicle engine is running and a steering wheel is rotated beyond a predefined magnitude.

19. The vehicle of claim 13, wherein the vehicle sensor is a speed sensor that communicates with the controller such that the light source sequentially illuminates a plurality of arrows of a rear portion of the vehicle when a vehicle speed drops below a predefined rate.

* * * * *